United States Patent [19]

Kresge et al.

[11] Patent Number: 5,837,639

[45] Date of Patent: *Nov. 17, 1998

[54] HYDROPROCESSING CATALYST

[75] Inventors: Charles T. Kresge, Westchester, Pa.; Michael E. Leonowicz, Medford Lakes; Wieslaw J. Roth, Sewell, both of N.J.; James C. Vartuli, West Chester, Pa.

[73] Assignee: Mobil Oil Corporation, Fairfax, Va.

[*] Notice: The portion of the term of this patent subsequent to Mar. 24, 2009, has been disclaimed.

[21] Appl. No.: 734,998

[22] Filed: Jul. 24, 1991

Related U.S. Application Data

[63] Continuation-in-part of Ser. No. 625,245, Dec. 10, 1990, Pat. No. 5,098,684, which is a continuation-in-part of Ser. No. 470,008, Jan. 25, 1990, Pat. No. 5,102,643.

[51] Int. Cl.$^6$ .................... B01J 29/00; B01J 29/064
[52] U.S. Cl. .................... 502/64; 502/66; 423/328.2; 423/329.1
[58] Field of Search .................... 502/64, 66; 423/328, 423/326

[56] References Cited

U.S. PATENT DOCUMENTS

| | | | |
|---|---|---|---|
| 3,755,145 | 8/1973 | Orkin | 208/111 |
| 3,884,835 | 5/1975 | Vaughan | 252/451 |
| 4,091,079 | 5/1978 | Vaughan | 423/328 |
| 4,673,559 | 6/1987 | Derouane et al. | 423/306 |
| 4,791,088 | 12/1988 | Chu et al. | 502/232 |
| 4,880,611 | 11/1989 | von Ballmoos et al. | 423/306 |
| 4,981,663 | 1/1991 | Rubin | 502/64 |
| 4,983,273 | 1/1991 | Kennedy et al. | 208/111 |
| 5,098,684 | 3/1992 | Kresge et al. | 502/64 |
| 5,102,643 | 4/1992 | Kresge et al. | 423/328 |

OTHER PUBLICATIONS

Szostak et al. Zeolites, Facts, Figures, Futures. Elservier Science Publ. by 1989, pp. 439–446, discusses the structure of cacoxenite.

*Primary Examiner*—Glenn Caldarola
*Attorney, Agent, or Firm*—Peter W. Roberts; Malcolm D. Keen

[57] ABSTRACT

A catalytic composition comprises a metal hydrogenation-dehydrogenation component supported on a support material comprising an ultra-large pore crystalline material of high surface area and porosity. The crystalline material exhibits unusually large sorption capacity demonstrated by its benzene adsorption capacity of greater than about 15 grams benzene/100 grams at 50 torr and 25° C., and has uniformly sized pores with a maximum perpendicular cross section of at least about 13 Å. In a preferred form, the support material, which is preferably a metallosilicate such as an aluminosilicate, has the pores in a hexagonal arrangement, giving rise to a hexagonal electron diffraction pattern that can be indexed with a $d_{100}$ value greater than about 18 Å.

35 Claims, No Drawings

HYDROPROCESSING CATALYST

CROSS-REFERENCE TO RELATED APPLICATIONS

This application is a continuation-in-part of application Ser. No. 07/625,245, filed 10 Dec. 1990, now U.S. Pat. No. 5,098,684 which, in turn, is a continuation-in-part of Ser. No. 07/470,008, filed Jan. 25, 1990 now U.S. Pat. No. 5,102,643.

FIELD OF THE INVENTION

This invention relates to a hydroprocessing catalysts based on synthetic ultra-large pore size crystalline materials.

BACKGROUND OF THE INVENTION

Porous inorganic solids have found great utility as catalysts and separations media for industrial application. The openness of their microstructure allows molecules access to the relatively large surface areas of these materials that enhance their catalytic and sorptive activity. The porous materials in use today can be sorted into three broad categories using the details of their microstructure as a basis for classification. These categories are the amorphous and paracrystalline supports, the crystalline molecular sieves and modified layered materials. The detailed differences in the microstructures of these materials manifest themselves as important differences in the catalytic and sorptive behavior of the materials, as well as in differences in various observable properties used to characterize them, such as their surface area, the sizes of pores and the variability in those sizes, the presence or absence of X-ray diffraction patterns and the details in such patterns, and the appearance of the materials when their microstructure is studied by transmission electron microscopy and electron diffraction methods.

Amorphous and paracrystalline materials represent an important class of porous inorganic solids that have been used for many years in industrial applications. Typical examples of these materials are the amorphous silicas commonly used in catalyst formulations and the paracrystalline transitional aluminas used as solid acid catalysts and petroleum reforming catalyst supports. The term "amorphous" is used here to indicate a material with no long range order and can be somewhat misleading, since almost all materials are ordered to some degree, at least on the local scale. An alternate term that has been used to describe these materials is "X-ray indifferent". The microstructure of the silicas consists of 100–250 Angstrom particles of dense amorphous silica (*Kirk-Othmer Encyclopedia of Chemical Technology*, 3rd Edition, Vol. 20, John Wiley & Sons, New York, p. 766–781, 1982), with the porosity resulting from voids between the particles. Since there is no long range order in these materials, the pores tend to be distributed over a rather large range. This lack of order also manifests itself in the X-ray diffraction pattern, which is usually featureless.

Paracrystalline materials such as the transitional aluminas also have a wide distribution of pore sizes, but better defined X-ray diffraction patterns usually consisting of a few broad peaks. The microstructure of these materials consists of tiny crystalline regions of condensed alumina phases and the porosity of the materials results from irregular voids between these regions (K. Wefers and Chanakya Misra, "Oxides and Hydroxides of Aluminum", Technical Paper No. 19 Revised, Alcoa Research Laboratories, p. 54–59, 1987). Since, in the case of either material, there is no long range order controlling the sizes of pores in the material, the variability in pore size is typically quite high. The sizes of pores in these materials fall into a regime called the mesoporous range, which, for the purposes of this application, is from about 13 to 200 Argstroms.

In sharp contrast to these structurally ill-defined solids are materials whose pore size distribution is very narrow because it is controlled by the precisely repeating crystalline nature of the materials' microstructure. These materials are called "molecular sieves", the most important examples of which are zeolites.

Zeolites, both natural and synthetic, have been demonstrated in the past to have catalytic properties for various types of hydrocarbon conversion. Certain zeolitic materials are ordered, porous crystalline aluminosilicates having a definite crystalline structure as determined by X-ray diffraction, within which there are a large number of smaller cavities which may be interconnected by a number of still smaller channels or pores. These cavities and pores are uniform in size within a specific zeolitic material. Since the dimensions of these pores are such as to accept for adsorption molecules of certain dimensions while rejecting those of larger dimensions, these materials are known as "molecular sieves" and are utilized in a variety of ways to take advantage of these properties.

Such molecular sieves, both natural and synthetic, include a wide variety of positive ion-containing crystalline silicates. These silicates can be described as a rigid three-dimensional framework of $SiO_4$ and Periodic Table Group IIIB element oxide, e.g. $AlO_4$, in which the tetrahedra are cross-linked by the sharing of oxygen atoms whereby the ratio of the total Group IIIB element, e.g. aluminum, and Group IVB element, e.g. silicon, atoms to oxygen atoms is 1:2. The electrovalence of the tetrahedra containing the Group IIIB element, e.g. aluminum, is balanced by the inclusion in the crystal of a cation, for example, an alkali metal or an alkaline earth metal cation. This can be expressed wherein the ratio of the Group IIIB element, e.g. aluminum, to the number of various cations, such as $Ca/2$, $Sr/2$, Na, K or Li, is equal to unity. One type of cation may be exchanged either entirely or partially with another type of cation utilizing ion exchange techniques in a conventional manner. By means of such cation exchange, it has been possible to vary the properties of a given silicate by suitable selection of the cation. The spaces between the tetrahedra are occupied by molecules of water prior to dehydration.

Prior art techniques have resulted in the formation of a great variety of synthetic zeolites. Many of these zeolites have come to be designated by letter or other convenient symbols, as illustrated by zeolite A (U.S. Pat. No. 2,882, 243); zeolite X (U.S. Pat. No. 2,882,244); zeolite Y (U.S. Pat. No. 3,130,007); zeolite ZK-5 (U.S. Pat. No. 3,247,195); zeolite ZK-4 (U.S. Pat. No. 3,314,752); zeolite ZSM-5 (U.S. Pat. No. 3,702,886); zeolite ZSM-11 (U.S. Pat. No. 3,709, 979); zeolite ZSM-12 (U.S. Pat. No. 3,832,449); zeolite ZSM-20 (U.S. Pat. No. 3,972,983); ZSM-35 (U.S. Pat. No. 4,016,245); and zeolite ZSM-23 (U.S. Pat. No. 4,076,842), merely to name a few.

The $SiO_2/Al_2O_3$ ratio of a given zeolite is often variable. For example, zeolite X can be synthesized with $SiO_2/Al_2O_3$ ratios of from 2 to 3; zeolite Y, from 3 to about 6. In some zeolites, the upper limit of the $SiO_2/Al_2O_3$ ratio is unbounded. ZSM-5 is one such example wherein the $SiO_2/Al_2O_3$ ratio is at least 5 and up to the limits of present analytical measurement techniques. U.S. Pat. No. 3,941,871 (Re. 29,948) discloses a porous crystalline silicate made from a reaction mixture containing no deliberately added alumina in the recipe and exhibiting the X-ray diffraction pattern characteristic of ZSM-5. U.S. Pat. Nos. 4,061,724; 4,073,865 and 4,104,294 describe crystalline silicate of varying alumina and metal content.

Aluminum phosphates are taught in U.S. Pat. Nos. 4,310,440 and 4,385,994, for example. These aluminum phosphate materials have essentially electroneutral lattices. U.S. Pat. No. 3,801,704 teaches an aluminum phosphate treated in a certain way to impart acidity.

An early reference to a hydrated aluminum phosphate which is crystalline until heated at about 110° C., at which point it becomes amorphous or transforms, is the "$H_1$" phase or hydrate of aluminum phosphate of F.d'Yvoire, *Memoir Presented to the Chemical Society*, No. 392, "Study of Aluminum Phosphate and Trivalent Iron", Jul. 6, 1961 (received), pp. 1762–1776. This material, when crystalline, is identified by the JCPDS International Center for Diffraction Data card number 15–274. Once heated at about 110° C., however, the d'Yvoire material becomes amorphous; or transforms to the aluminophosphate form of tridymite.

Compositions comprising crystals having a framework topology after heating at 110° C. or higher giving an X-ray diffraction pattern consistent with a material having pore windows formed by 18 tetrahedral members of about 12–13 Angstroms in diameter are taught in U.S. Pat. No. 4,880,611.

A naturally occurring, highly hydrated basic ferric oxyphosphate mineral, cacoxenite, is reported by Moore and Shen, Nature, Vol. 306, No. 5941, pp. 356–358 (1983) to have a framework structure containing very large channels with a calculated free pore diameter of 14.2 Angstroms. R. Szostak et al., *Zeolites: Facts, Figures, Future*, Elsevier Science Publishers B.V., 1989, present work showing cacoxenite as being very hydrophilic, i.e. adsorbing non-polar hydrocarbons only with great difficulty. Their work also shows that thermal treatment of cacoxenite causes an overall decline in X-ray peak intensity.

Silicoaluminophosphates of various structures are taught in U.S. Pat. No. 4,440,871. Aluminosilicates containing phosphorous, i.e. silicoaluminophosphates of particular structures are taught in U.S. Pat. Nos. 3,355,246 (i.e. ZK-21) and 3,791,964 (i.e. ZK-22). Other teachings of silicoaluminophosphates and their synthesis include U.S. Pat. Nos. 4,673,559 (two-phase synthesis method); 4,623,527 (MCM-10); 4,639,358 (MCM-1); 4,647,442 (MCM-2); 4,664,897 (MCM-4); 4,638,357 (MCM-5); and 4,632,811 (MCM-3).

A method for synthesizing crystalline metalloaluminophosphates is shown in U.S. Pat. No. 4,713,227, and an antimonophosphoaluminate and the method for its synthesis are taught in U.S. Pat. No. 4,619,818. U.S. Pat. No. 4,567,029 teaches metalloaluminophosphates, and titaniumaluminophosphate and the method for its synthesis are taught in U.S. Pat. No. 4,500,651.

The phosphorus-substituted zeolites of Canadian Patents 911,416; 911,417; and 911,418 are referred to as "aluminosilicophosphate" zeolites. Some of the phosphorus therein appears to be occluded, not structural.

U.S. Pat. No. 4,363,748 describes a combination of silica and aluminum-calcium-cerium phosphate as a low acid activity catalyst for oxidative dehydrogenation. Great Britain Patent 2,068,253 discloses a combination of silica and aluminum-calcium-tungsten phosphate as a low acid activity catalyst for oxidative dehydrogenation. U.S. Pat. No. 4,228,036 teaches an alumina-aluminum phosphate-silica matrix as an amorphous body to be mixed with zeolite for use as cracking catalyst. U.S. Pat. No. 3,213,035 teaches improving hardness of aluminosilicate catalysts by treatment with phosphoric acid. The catalysts are amorphous.

Other patents teaching aluminum phosphates include U.S. Pat. Nos. 4,365,095; 4,361,705; 4,222,896; 4,210,560; 4,179,358; 4,158,621; 4,071,471; 4,014,945; 3,904,550; and 3,697,550.

The precise crystalline microstructure of most zeolites manifests itself in a well-defined X-ray diffraction pattern that usually contains many sharp maxima and that serves to uniquely define the material. Similarly, the dimensions of pores in these materials are very regular, due to the precise repetition of the crystalline microstructure. All molecular sieves discovered to date have pore sizes in the microporous range, which is usually quoted as 2 to 20 Angstroms, with the largest reported being about 12 Angstroms.

Certain layered materials, which contain layers capable of being spaced apart with a swelling agent, may be pillared to provide materials having a large degree of porosity. Examples of such layered materials include clays. Such clays may be swollen with water, whereby the layers of the clay are spaced apart by water molecules. Other layered materials are not swellable with water, but may be swollen with certain organic swelling agents such as amines and quaternary ammonium compounds. Examples of such non-water swellable layered materials are described in U.S. Pat. No. 4,859,648 and include layered silicates, magadiite, kenyaite, trititanates and perovskites. Another example of a non-water swellable layered material, which can be swollen with certain organic swelling agents, is a vacancy-containing titanometallate material, as described in U.S. Pat. No. 4,831,006.

Once a layered material is swollen, the material may be pillared by interposing a thermally stable substance, such as silica, between the spaced apart layers. The aforementioned U.S. Pat. Nos. 4,831,006 and 4,859,648 describe methods for pillaring the non-water swellable layered materials described therein and are incorporated herein by reference for definition of pillaring and pillared materials.

Other patents teaching pillaring of layered materials and the pillared products include U.S. Pat. Nos. 4,216,188; 4,248,739; 4,176,090; and 4,367,163; and European Patent Application 205,711.

The X-ray diffraction patterns of pillared layered materials can vary considerably, depending on the degree that swelling and pillaring disrupt the otherwise usually well-ordered layered microstructure. The regularity of the microstructure in some pillared layered materials is so badly disrupted that only one peak in the low angle region on the X-ray diffraction pattern is observed, at a d-spacing corresponding to the interlayer repeat in the pillared material. Less disrupted materials may show several peaks in this region that are generally orders of this fundamental repeat. X-ray reflections from the crystalline structure of the layers are also sometimes observed. The pore size distribution in these pillared layered materials is narrower than those in amorphous and paracrystalline materials but broader than that in crystalline framework materials.

Many chemical processes, especially in the petroleum refining and petrochemical industries utilize bifunctional catalysts which exhibit both acidic and hydrogenation-dehydrogenation activity. Catalysts of this type are frequently used in the processing of various hydrocarbon fractions in processes where hydrogen is present either as a feed component or as a product of the reaction such as hydrogenation, hydrocracking, hydrotreating, hydrofinishing, hydrodewaxing (see U.S. Pat. No. 3,968,024), hydrodemetallation, hydroisomerization, reforming and the like. For the purposes of this application processes of this type are referred to as hydroprocessing applications regardless of whether the hydrogen is used as a feed component i.e. a reactant as in hydrocracking, or is produced in the process as one of the reaction products as in reforming. Bifunctional catalysts are utilized in various petrochemical hydroprocessing applications such as, for example, xylene isomerization, as described in U.S. Pat. Nos. 3,856,572; 4,101,597 and 4,312,790; toluene disproportionation as described in U.S. Pat. No. 4,052,476 and other reactions where hydrogen is present either as a feed component or as a product of the desired reaction. In many petroleum refining applications, the metal component is supported on an amorphous support material such as alumina or silica-alumina since these materials often have the requisite pore volumes and the appropriate pore sizes for the high molecular weight hydrocarbons which may be encountered in the processing.

SUMMARY OF THE INVENTION

The present invention is directed to bifunctional catalysts which are based on a novel class of materials with useful catalytic properties. According to the present invention, the bifunctional catalysts which may be used to catalyze a wide variety of reactions, especially hydroprocessing reactions such as those referred to above, comprise a metal hydrogenation-dehydrogenation component which is supported on a synthetic composition of matter comprising an ultra-large pore crystalline phase. The crystalline material of this invention is an inorganic, porous, non-layered phase having uniformly-sized pores with a maximum perpendicular cross-section pore dimension of at least about 13 Angstroms (Å), usually within the range of from about 13 Angstroms to about 200 Angstroms. These crystalline materials exhibit an X-ray diffraction pattern with at least one peak having a relative intensity of 100 at a d-spacing greater than about 18 Å. They possess high porosities and surface areas which results in correspondingly high sorptive capacities indicated by a benzene adsorption capacity of greater than about 15 grams benzene/100 grams crystal at 50 torr and 25° C. They may also be characterized by the electron diffraction pattern which can be indexed with a $d_{100}$ value greater than about 18 Angstroms. In a preferred embodiment, the pores are arranged in a uniform hexagonal arrangement which is manifested in the X-ray and electron diffraction patterns.

DESCRIPTION OF SPECIFIC EMBODIMENTS

As demonstrated hereinafter, the inorganic, non-layered mesoporous crystalline materials used to support the metal component of the catalysts have the following composition:

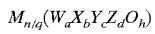

wherein W is a divalent element, such as a divalent first row transition metal, e.g. manganese, cobalt and iron, and/or magnesium, preferably cobalt; X is a trivalent element, such as aluminum, boron, iron and/or gallium, preferably aluminum; Y is a tetravalent element such as silicon and/or germanium, preferably silicon; Z is a pentavalent element, such as phosphorus; M is one or more ions, such as, for example, ammonium, Group IA, IIA and VIIB ions, usually hydrogen, sodium and/or fluoride ions; n is the charge of the composition excluding M expressed as oxides; q is the weighted molar average valence of M; n/q is the number of moles or mole fraction of M; a, b, c, and d are mole fractions of W, X, Y and Z, respectively; h is a number of from 1 to 2.5; and (a+b+c+d)=1.

A preferred embodiment of the above crystalline material is when (a+b+c) is greater than d, and h=2. A further embodiment is when a and d=0, and h=2.

In the as-synthesized form, the crystalline support has a composition, on an anhydrous basis, expressed empirically as follows:

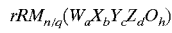

wherein R is the total organic material not included in M as an ion, and r is the coefficient for R, i.e. the number of moles or mole fraction of R.

For the purposes of making the present bifunctional catalysts, the preferred forms are the metallosilicates, of which the aluminosilicate is usually the most preferred.

The M and R components are associated with the material as a result of their presence during crystallization, and are easily removed or, in the case of M, replaced by post-crystallization methods hereinafter more particularly described.

To the extent desired, the original M, e.g. sodium or chloride, ions of the as-synthesized material of this invention can be replaced in accordance with techniques well known in the art, at least in part, by ion exchange with other ions. Preferred replacing ions include metal ions, hydrogen ions, hydrogen precursor, e.g. ammonium, ions and mixtures thereof. For use in the present catalysts, cations of metals which exhibit hydrogenation-dehydrogenation functionality may be exchanged into the crystalline material to provide some or all of the metal component. One advantage accruing from the large pores size of the mesoporous materials is that it is possible to carry out a cation exchange without the necessity of calcining the as-synthesized material to remove the organic materials used in the synthesis. As an alternative (or in addition to) the incorporation of the metal component of the catalyst by exchange, the metal may also be provided by impregnation using cations or anions of the metal or metals, as described further below. Cations which may be exchanged into the crystalline material include hydrogen, rare earth metals and metals of Groups IA (e.g. K), IIA (e.g. Ca), VIA (e.g. Cr, Mo, W), VIIA (e.g. Mn), VIIIA (e.g. Ni), IB (e.g. Cu), IIB (e.g. Zn), IIIB (e.g. In), IVB (e.g. Sn), and VIIB (e.g. F) of the Periodic Table of the Elements (Sargent-Welch Scientific Co. Cat. No. S-18806, 1979) and mixtures of these cations.

The crystalline (i.e. meant here as having sufficient order to provide a diffraction pattern such as, for example, by X-ray, electron or neutron diffraction, following calcination with at least one peak) mesoporous material of this invention may be characterized by its heretofore unknown structure, including extremely large pore windows, and high sorption capacity. The term "mesoporous" is used here to indicate crystals having uniform pores within the range of from about 13 Angstroms to about 200 Angstroms. The materials of this invention will have uniform pores within the range of from about 13 Angstroms to about 200 Angstroms, more usually from about 15 Angstroms to about 100 Angstroms. For the purposes of this application, a working definition of "porous" is a material that adsorbs at least 1 gram of a small molecule, such as Ar, $N_2$, n-hexane or cyclohexane, per 100 grams of the solid.

The mesoporous material used as the support component of the present catalysts can be distinguished from other porous inorganic solids by the regularity of its large open pores, whose pore size more nearly resembles that of amorphous or paracrystalline materials, but whose regular arrangement and uniformity of size (pore size distribution within a single phase of, for example, ±25%, usually ±15% or less of the average pore size of that phase) resemble more those of crystalline framework materials such as zeolites. In its preferred form, the crystalline support material appears to have a hexagonal arrangement of large open channels that can be synthesized with open internal diameters from about 13 Angstroms to about 200 Angstroms. The term "hexagonal" is intended to encompass not only materials that exhibit mathematically perfect hexagonal symmetry within the limits of experimental measurement, but also those with significant observable deviations from that ideal state. A working definition is applied to the microstructure of the present invention would be that most channels in the material would be surrounded by six nearest neighbor channels at roughly the same distance. Defects and imperfections will cause significant numbers of channels to violate this criterion to varying degrees, depending on the quality of the material's preparation. Samples which exhibit as much as ±25% random deviation from the average repeat distance between adjacent channels still clearly give recognizable images of the present ultra-large pore materials. Comparable variations are also observed in the $d_{100}$ values from the electron diffraction patterns. The preferred hexagonal crystalline support materials, referred to below as having the structure of MCM-41, are described in detail in Application Ser. No. 07/625,245, to which reference is made for a more extended description of these materials, their preparation and properties, including examples of their X-ray and electron diffraction patterns.

The most regular preparations of the crystalline support materials give an X-ray diffraction pattern with a few distinct maxima in the extreme low angle region. In the preferred hexagonal materials, the positions of these peaks approximately fit the positions of the hk0 reflections from a hexagonal lattice. The X-ray diffraction pattern, however, is not always a sufficient indicator of the presence of these materials, as the degree of regularity in the microstructure and the extent of repetition of the structure within individual particles affect the number of peaks that will be observed. Indeed, preparations with only one distinct peak in the low angle region of the X-ray diffraction pattern have been found to contain substantial amounts of the material in them. Other techniques to illustrate the microstructure of this material are transmission electron microscopy and electron diffraction. Properly oriented specimens of the material show, in the preferred materials, a hexagonal arrangement of large channels and the corresponding electron diffraction pattern gives an approximately hexagonal arrangement of diffraction maxima. The $d_{100}$ spacing of the electron diffraction patterns is the distance between adjacent spots on the hk0 projection of the hexagonal lattice and is related to the repeat distance $a_0$ between channels observed in the electron micrographs through the formula $d_{100}=a_0\sqrt{3}/2$. This $d_{100}$ spacing observed in the electron diffraction patterns corresponds to the d-spacing of a low angle peak in the X-ray diffraction pattern of the material. The most highly ordered preparations of the material obtained so far have 20–40 distinct spots observable in the electron diffraction patterns. These patterns can be indexed with the hexagonal hk0 subset of unique reflections of 100, 110, 200, 210, etc., and their symmetry-related reflections.

In its calcined form, the crystalline support materials may be further characterized by an X-ray diffraction pattern with at least one peak at a position greater than about 18 Angstrom Units d-spacing (4.909 degrees two-theta for Cu K-alpha radiation) which corresponds to the $d_{100}$ value of the electron diffraction pattern of the material, and an equilibrium benzene adsorption capacity of greater than about 15 grams benzene/100 grams crystal at 50 torr and 25° C. (basis: crystal material having been treated in an attempt to insure no pore blockage by incidental contaminants, if necessary).

The equilibrium benzene adsorption capacity characteristic of the crystalline support material is measured on the basis of no pore blockage by incidental contaminants. For instance, the sorption test will be conducted on the crystalline material phase having any pore blockage contaminants and water removed by ordinary methods. Water may be removed by dehydration techniques, e.g. thermal treatment. Pore blocking inorganic amorphous materials, e.g. silica, and organics may be removed by contact with acid or base or other chemical agents such that the detrital material will be removed without detrimental effect on the crystal.

More particularly, the calcined crystalline material may be characterized by its X-ray diffraction pattern which exhibits at least two peaks at positions greater than about 10 Angstrom Units d-spacing (8.842 degrees two-theta for Cu K-alpha radiation), at least one of which is at a position greater than about 18 Angstrom Units d-spacing, and no peaks at positions less than about 10 Angstrom units d-spacing with relative intensity greater than about 20% of the strongest peak. Still more particularly, the X-ray diffraction pattern of the calcined support material will have no peaks at positions less than about 10 Angstrom units d-spacing with relative intensity greater than about 10% of the strongest peak. In any event, at least one peak in the X-ray diffraction pattern will have a d-spacing that corresponds to the $d_{100}$ value of the electron diffraction pattern of the material.

Still more particularly, the calcined inorganic, non-layered crystalline material of the invention is characterized as having a pore size of about 13 Angstroms or greater as measured by physisorption measurements, hereinafter more particularly set forth. Pore size is considered a maximum perpendicular cross-section pore dimension of the crystal.

X-ray diffraction data referred to here were collected on a Scintag PAD X automated diffraction system employing theta-theta geometry, Cu K-alpha radiation, and an energy dispersive X-ray detector. Use of the energy dispersive X-ray detector eliminated the need for incident or diffracted beam monochromators. Both the incident and diffracted X-ray beams were collimated by double slit incident and diffracted collimation systems. The slit sizes used, starting from the X-ray tube source, were 0.5, 1.0, 0.3 and 0.2 mm, respectively. Different slit systems may produce differing intensities for the peaks. The materials of the present invention that have the largest pore sizes may require more highly collimated incident X-ray beams in order to resolve the low angle peak from the transmitted incident X-ray beam.

The diffraction data were recorded by step-scanning at 0.04 degrees of two-theta, where theta is the Bragg angle, and a counting time of 10 seconds for each step. The interplanar spacings, d's, were calculated in Angstrom units (A), and the relative intensities of the lines, $I/I_o$, where $I_o$ is one-hundredth of the intensity of the strongest line, above background, were derived with the use of a profile fitting routine. The intensities were uncorrected for Lorentz and polarization effects. The relative intensities are given in terms of the symbols vs=very strong (75–100), s=strong (50–74), m=medium (25–49) and w=weak (0–24). It should be understood that diffraction data listed as single lines may consist of multiple overlapping lines which under certain conditions, such as very high experimental resolution or crystallographic changes, may appear as resolved or partially resolved lines. Typically, crystallographic changes can include minor changes in unit cell parameters and/or a change in crystal symmetry, without a substantial change in structure. These minor effects, including changes in relative intensities, can also occur as a result of differences in cation content, framework composition, nature and degree of pore filling, thermal and/or hydrothermal history, and peak width/shape variations due to particle size/shape effects, structural disorder or other factors known to those skilled in the art of X-ray diffraction.

The equilibrium benzene adsorption capacity is determined by contacting the crystalline material, after dehydration or calcination at, for example, about 540° C. for at least about one hour and other treatment, if necessary, in an attempt to remove any pore blocking contaminants, at 25° C. and 50 torr benzene until equilibrium is reached. The weight of benzene sorbed is then determined as more particularly described hereinafter.

When synthesized by the methods described below, the crystalline material contains, in its as-synthesized condition, the organic material used as the directing agent. Prior to use as a catalyst component, the composition should be subjected to treatment to remove part or all of any organic constituent. Removal of the organic is necessary to permit introduction of the metal component either by exchange or impregnation, or both, since the organic component occluded in the pores of the crystalline phase, precludes access to the internal pore structure of the material.

The crystalline material, especially in its ammonium form, can be beneficially converted to another form by thermal treatment (calcination). This thermal treatment is generally performed by heating one of these forms at a temperature of at least 400° C. for at least 1 minute and generally not longer than 20 hours, preferably from about 1 to about 10 hours. While subatmospheric pressure can be employed for the thermal treatment, atmospheric pressure is desired for reasons of convenience, such as in air, nitrogen, ammonia, etc. The thermal treatment can be performed at a temperature up to about 750° C. The thermal treatment of the ammonium form in this way is an especially useful technique for the preparation of the hydrogen form of the catalytic material, to confer the acidic functionality of the final catalyst.

The crystalline material should be dehydrated, at least partially. This can be done by heating to a temperature in the range of 200° C. to 595° C. in an atmosphere such as air, nitrogen, etc. and at atmospheric, subatmospheric or superatmospheric pressures for between 30 minutes and 48 hours. Dehydration can also be performed at room temperature merely by placing the composition in a vacuum, but a longer time is required to obtain a sufficient amount of dehydration.

The present crystalline material can be prepared by one of several methods, each with particular limitations.

A first method involves a reaction mixture having an $X_2O_3/YO_2$ mole ratio of from 0 to about 0.5, but an $Al_2O_3/SiO_2$ mole ratio of from 0 to 0.01, a crystallization temperature of from about 25° C. to about 250° C., preferably from about 50° C. to about 175° C., and an organic directing agent, hereinafter more particularly described, or, preferably a combination of that organic directing agent plus an additional organic directing agent, hereinafter more particularly described. This first method comprises preparing a reaction mixture containing sources of, for example, alkali or alkaline earth metal (M), e.g. sodium or potassium, cation if desired, one or a combination of oxides selected from the group consisting of divalent element W, e.g. cobalt, trivalent element X, e.g. aluminum, tetravalent element Y, e.g. silicon, and pentavalent element Z, e.g. phosphorus, an organic (R) directing agent, hereinafter more particularly described, and a solvent or solvent mixture, such as, for example, $C_1$–$C_6$ alcohols, $C_1$–$C_6$ diols and/or water, especially water, said reaction mixture having a composition, in terms of mole ratios of oxides, within the following ranges:

| Reactants | Useful | Preferred |
|---|---|---|
| $X_2O_3/YO_2$ | 0 to 0.5 | 0.001 to 0.5 |
| $Al_2O_3/SiO_2$ | 0 to 0.01 | 0.001 to 0.01 |
| $X_2O_3/(YO_2 + Z_2O_5)$ | 0.1 to 100 | 0.1 to 20 |
| $X_2O_3/(YO_2 + WO + Z_2O_5)$ | 0.1 to 100 | 0.1 to 20 |
| Solvent/$(YO_2 + WO + Z_2O_5 + X_2O_3)$ | 1 to 1500 | 5 to 1000 |
| $OH^-/YO_2$ | 0 to 10 | 0 to 5 |
| $(M_{2/e}O + R_{2/f}O)/(YO_2 + WO + Z_2O_5 + X_2O_3)$ | 0.01 to 20 | 0.05 to 5 |
| $M_{2/e}O/(YO_2 + WO + Z_2O_5 + X_2O_3)$ | 0 to 10 | 0 to 5 |
| $R_{2/f}O/(YO_2 + WO + Z_2O_5 + X_2O_3)$ | 0.01 to 2.0 | 0.03 to 1.0 | wherein e and f are the weighted average valences of M and R, respectively.

In this first method, when no Z and/or W oxides are added to the reaction mixture, the pH is important and must be maintained at from about 9 to about 14. When Z and/or W oxides are present in the reaction mixture, the pH is not narrowly important for synthesis of the present crystalline material. In this, as well as the following methods for synthesis of the present material the $R_{2/f}O/(YO_2+WO+Z_2O_5+X_2O_3)$ ratio is important. When this ratio is less than 0.01 or greater than 2.0, impurity products tend to be synthesized at the expense of the present material.

A second method for synthesis of the present crystalline material involves a reaction mixture having an $X_2O_3/YO_2$ mole ratio of from about 0 to about 0.5, a crystallization temperature of from about 25° C. to about 250° C., preferably from about 50° C. to about 175° C., and two separate organic directing agents, i.e. the organic and additional organic directing agents, hereinafter more particularly described. This second method comprises preparing a reaction mixture containing sources of, for example, alkali or alkaline earth metal (M), e.g. sodium or potassium, cation if desired, one or a combination of oxides selected from the group consisting of divalent element W, e.g. cobalt, trivalent element X, e.g. aluminum, tetravalent element Y, e.g. silicon, and pentavalent element Z, e.g. phosphorus, a combination of organic directing agent and additional organic directing agent (R), each hereinafter more particularly described, and a solvent or solvent mixture, such as, for example, $C_1$–$C_6$ alcohols, $C_1$–$C_6$ diols and/or water, especially water, said reaction mixture having a composition, in terms of mole ratios of oxides, within the following ranges:

| Reactants | Useful | Preferred |
|---|---|---|
| $X_2O_3/YO_2$ | 0 to 0.5 | 0.001 to 0.5 |
| $X_2O_3/(YO_2 + Z_2O_5)$ | 0.1 to 100 | 0.1 to 20 |
| $X_2O_3/(YO_2 + WO + Z_2O_5)$ | 0.1 to 100 | 0.1 to 20 |
| Solvent/$(YO_2 + WO + Z_2O_5 + X_2O_3)$ | 1 to 1500 | 5 to 1000 |
| $OH^-/YO_2$ | 0 to 10 | 0 to 5 |
| $(M_{2/e}O + R_{2/f}O)/(YO_2 + WO + Z_2O_5 + X_2O_3)$ | 0.01 to 20 | 0.05 to 5 |
| $M_{2/e}O/(YO_2 + WO + Z_2O_5 + X_2O_3)$ | 0 to 10 | 0 to 5 |
| $R_{2/f}O/(YO_2 + WO + Z_2O_5 + X_2O_3)$ | 0.1 to 2.0 | 0.12 to 1.0 | wherein e and f are the weighted average valences of M and R, respectively.

In this second method, when no Z and/or W oxides are added to the reaction mixture, the pH is important and must be maintained at from about 9 to about 14. When Z and/or W oxides are present in the reaction mixture, the pH is not narrowly important for crystallization of the present invention.

A third method for synthesis of the present crystalline material is where X comprises aluminum and Y comprises silicon, the crystallization temperature must be from about 25° C. to about 175° C., preferably from about 50° C. to about 150° C., and an organic directing agent, hereinafter more particularly described, or, preferably a combination of that organic directing agent plus an additional organic agent, hereinafter more particularly described, is used. This third method comprises preparing a reaction mixture containing sources of, for example, alkali or alkaline earth metal (M), e.g. sodium or potassium, cation if desired, one or more sources of aluminum and/or silicon, an organic (R) directing agent, hereinafter more particularly described, and a solvent or solvent mixture, such as, for example $C_1$–$C_6$ alcohols, $C_1$–$C_6$ diols and/or water, especially water, said reaction mixture having a composition, in terms of mole ratios of oxides, within the following ranges:

| Reactants | Useful | Preferred |
|---|---|---|
| $Al_2O_3/SiO_2$ | 0 to 0.5 | 0.001 to 0.5 |
| Solvent/$SiO_2$ | 1 to 1500 | 5 to 1000 |
| $OH^-/SiO_2$ | 0 to 10 | 0 to 5 |
| $(M_{2/e}O + R_{2/f}O)/(SiO_2 + Al_2O_3)$ | 0.01 to 20 | 0.05 to 5 |
| $M_{2/e}O/(SiO_2 + Al_2O_3)$ | 0 to 5 | 0 to 3 |
| $R_{2/f}O/(SiO_2 + Al_2O_3)$ | 0.01 to 2 | 0.03 to 1 | wherein e and f are the weighted average valences of M and R, respectively.

In this third method, the pH is important and must be maintained at from about 9 to about 14. This method involves the following steps:

(1) Mix the organic (R) directing agent with the solvent or solvent mixture such that the mole ratio of solvent/$R_{2/f}O$ is within the range of from about 50 to about 800, preferably from about 50 to 500. This mixture constitutes the "primary template" for the synthesis method.

(2) To the primary template mixture of step (1) add the sources of oxides, e.g. silica and/or alumina such that the ratio of $R_{2/f}O/(SiO_2+Al_2O_3)$ is within the range of from about 0.01 to about 2.0.

(3) Agitate the mixture resulting from step (2) at a temperature of from about 20° C. to about 40° C., preferably for from about 5 minutes to about 3 hours.

(4) Allow the mixture to stand with or without agitation, preferably at a temperature of from about 20° C. to about 100° C., and preferably for from about 10 minutes to about 24 hours.

(5) Crystallize the product from step (4) at a temperature of from about 50° C. to about 175° C., preferably for from about 1 hour to about 72 hours. Crystallization temperatures higher in the given ranges are most preferred.

A fourth method for the present synthesis involves the reaction mixture used for the third method, but the following specific procedure with tetraethylorthosilicate the source of silicon oxide:

(1) Mix the organic (R) directing agent with the solvent or solvent mixture such that the mole ratio of solvent/$R_{2/f}O$ is within the range of from about 50 to about 800, preferably from about 50 to 500. This mixture constitutes the "primary template" for the synthesis method.

(2) Mix the primary template mixture of step (1) with tetraethylorthosilicate and a source of aluminum oxide, if desired, such that the $R_{2/f}O/SiO_2$ mole ratio is in the range of from about 0.5 to about 2.0.

(3) Agitate the mixture resulting from step (2) for from about 10 minutes to about 6 hours, preferably from about 30 minutes to about 2 hours, at a temperature of from about 0° C. to about 25° C., and a pH of less than 12. This step permits hydrolysis/polymerization to take place and the resultant mixture will appear cloudy.

(4) Crystallize the product from step (3) at a temperature of from about 25° C. to about 150° C., preferably from about 95° C. to about 110° C., for from about 4 to about 72 hours, preferably from about 16 to about 48 hours.

In each of the above methods, batch crystallization of the present crystalline material can be carried out under either static or agitated, e.g. stirred, conditions in a suitable reactor vessel, such as for example, polypropylene jars or teflon lined or stainless steel autoclaves. Crystallization may also be conducted continuously in suitable equipment. The total useful range of temperatures for crystallization is noted above for each method for a time sufficient for crystallization to occur at the temperature used, e.g. from about 5 minutes to about 14 days. Thereafter, the crystals are separated from the liquid and recovered.

When a source of silicon is used in the synthesis method, it is preferred to use at least in part an organic silicate, such as, for example, a quaternary ammonium silicate. Non-limiting examples of such a silicate include tetramethylammonium silicate and tetraethylorthosilicate.

By adjusting conditions of the synthesis reaction for each method, like temperature, pH and time of reaction, etc., within the above limits, embodiments of the present non-layered crystalline material with a desired average pore size may be prepared. In particular, changing the pH, the temperature or the reaction time may promote formation of product crystals with different average pore size.

Non-limiting examples of various combinations of W, X, Y and Z contemplated for the first and second synthesis methods of the present invention include:

| W | X | Y | Z |
|---|---|---|---|
| — | Al | Si | — |
| — | Al | — | P |
| — | Al | Si | P |
| Co | Al | — | P |
| Co | Al | Si | P |
| — | — | Si | — | including the combinations of W being Mg, or an element selected from the divalent first row transition metals, e.g. Mn, Co and Fe; X being B, Ga or Fe; and Y being Ge.

An organic directing agent for use in each of the above methods for synthesizing the present material from the respective reaction mixtures is an ammonium or phosphonium ion of the formula $R_1R_2R_3R_4Q^+$, i.e.:

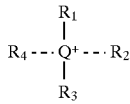

wherein Q is nitrogen or phosphorus and wherein at least one of $R_1$, $R_2$, $R_3$ and $R_4$ is aryl or alkyl of from 7 to about 36 carbon atoms, e.g. —$C_7H_{13}$, —$C_{10}H_{21}$, —$C_{16}H_{33}$ and —$C_{18}H_{37}$, or combinations thereof, the remainder of $R_1$, $R_2$, $R_3$ and $R_4$ being selected from the group consisting of hydrogen, alkyl of from 1 to 5 carbon atoms and combinations thereof. The compound from which the above ammonium or phosphonium ion is derived may be, for example, the hydroxide, halide, silicate, or mixtures thereof.

In the first and third methods above it is preferred to have an additional organic directing agent and in the second method it is required to have a combination of the above organic directing agent and an additional organic directing agent. That additional organic directing agent is the ammonium or phosphonium ion of the above directing agent formula wherein $R_1$, $R_2$, $R_3$ and $R_4$ together or separately are selected from the group consisting of hydrogen and alkyl of 1 to 5 carbon atoms and combinations thereof. Any such combination of organic directing agents go to make up "R" and will be in molar ratio of about 100/1 to about 0.01/1, first above listed organic directing agent/additional organic directing agent.

The particular effectiveness of the presently required directing agent, when compared with other such agents known to direct synthesis of one or more other crystal structures, is believed due to its ability to function as a template in the above reaction mixture in the nucleation and growth of the desired ultra-large pore crystals with the limitations discussed above. Non-limiting examples of these directing agents include cetyltrimethylammonium, cetyltrimethylphosphonium, octadecyltrimethylphosphonium, benzyltrimethylammonium, cetylpyridinium, myristyltrimethylammonium, decyltrimethylammonium, dodecyltrimethylammonium and dimethyldidodecylammonium.

The reaction mixture components can be supplied by more than one source. The reaction mixture can be prepared either batchwise or continuously. Crystal size and crystallization time of the new crystalline material will vary with the nature of the reaction mixture employed and the crystallization conditions.

The crystals prepared by the instant invention can be shaped into a wide variety of particle sizes. Generally speaking, the particles can be in the form of a powder, a granule, or a molded product, such as an extrudate having particle size sufficient to pass through a 2 mesh (Tyler) screen and be retained on a 400 mesh (Tyler) screen. In cases where the catalyst is molded, such as by extrusion, the crystals can be extruded before drying or partially dried and then extruded.

In the present bifunctional catalysts, the crystalline material is at least partly in the hydrogen form which is suitably formed by the thermal treatment or calcination of the ammonium form, as described above. In addition, however, the catalysts include a metal component which provides hydrogenation-dehydrogenation functionality. The hydrogenation-dehydrogenation component may be provided by a single metal or combination of metals. Noble metals of Periods 5 and 6 of Group VIII, especially palladium, platinum, ruthenium, rhodium or base metals of Groups IVA, VIA and VIII, especially chromium, molybdenum, tungsten, cobalt and nickel, may be used for hydrogenative processes such as hydrotreating, hydrocracking, hydrodewaxing and the like whereas for dehydrogenative processes such as reforming the noble metals such as iridium, rhenium may be preferred, especially in the form of combinations such as platinum-iridium, platinum-rhenium and platinum-rhenium-iridium.

The combination of at least one Group VIA metal such as tungsten with at least one Group VIII metal such as nickel is particularly preferred for many applications, for example, combinations such as nickel-molybdenum, cobalt-nickel, nickel-tungsten, cobalt-nickel-molybdenum and nickel-tungsten-titanium.

The content of the metal component will vary according to its catalytic activity and to the requirements of the process in which the catalyst is to be used. Thus, the highly active noble metals may be used in smaller amounts than the less active base metals. For example, about 0.1 wt. percent or less palladium or platinum will be effective and it will not normally be necessary to use more than 10 percent of the noble metals, and usually much less, for example, from about 0.1 to 1 or 2 weight percent. The amounts of base metals may be higher and it is a particular advantage of the present crystalline materials that their high porosity and high surface area permits large amounts of the metal component to be used without an unacceptable decrease in the surface area of the final catalyst. Thus, the amount of a base metal hydrogenation component will normally be at least 1 weight percent and often more than 5 percent will be required.

The metal hydrogenation component may be introduced into the catalyst by way of co-crystallization with the crystalline material, exchanged onto the crystalline phase to the extent a Group IIIB element, e.g. aluminum, is in the structure, impregnated into it or intimately physically admixed with it. If the metal is to be exchanged into the mesoporous support, it may be done by treatment with a cation of the metal, either a simple cation or a complex cation being suitable. Suitable platinum compounds, for example, include platinous chloride and various compounds containing the platinum amine complex. Impregnation may be carried out with metal compounds in which the metal component is present in the cation or the anion of the compound. Palladium or platinum compounds in which the metal is in the form of a cation of cationic complex, e.g., $Pd(NH_3)_4Cl_2$ or $Pt(NH_3)_4Cl_2$ are particularly useful, as are anionic complexes such as the vanadate, molybdate and metatungstate ions and, in the case of platinum, chloroplatinic acid.

It is normally preferred to use the crystalline material in a bound or matrixed form in which the crystalline material is composited with another material resistant to the temperatures and other conditions employed in organic conversion processes. Such materials include active and inactive materials and synthetic or naturally occurring zeolites as well as inorganic materials such as clays, silica and/or metal oxides such as alumina, titania and/or zirconia. The latter may be either naturally occurring or in the form of gelatinous precipitates or gels including mixtures of silica and metal oxides. Use of a material in conjunction with the new crystal, i.e. combined therewith or present during synthesis of the new crystal, which is active, tends to change the conversion and/or selectivity of the catalyst in certain organic conversion processes. Inactive materials suitably serve as diluents to control the amount of conversion in a given process so that products can be obtained economically and orderly without employing other means for controlling the rate of reaction. These materials may be incorporated with naturally occurring clays, e.g. bentonite and kaolin, to improve the crush strength of the catalyst under commercial operating conditions. Said materials, i.e. clays, oxides, etc., function as binders for the catalyst. It is desirable to provide a catalyst having good crush strength because in commercial use it is desirable to prevent the catalyst from breaking down into powder-like materials. These clay binders have been employed normally only for the purpose of improving the crush strength of the catalyst.

Naturally occurring clays which can be composited with the new crystal include the montmorillonite and kaolin family, which families include the subbentonites, and the kaolins commonly known as Dixie, McNamee, Georgia and Florida clays or others in which the main mineral constituent is halloysite, kaolinite, dickite, nacrite, or anauxite. Such clays can be used in the raw state as originally mined or initially subjected to calcination, acid treatment or chemical modification.

In addition to the foregoing materials, the new crystal can be composited with a porous matrix material such as silica-alumina, silica-magnesia, silica-zirconia, silica-thoria, silica-beryllia, silica-titania as well as ternary compositions such as silica-alumina-thoria, silica-alumina-zirconia, silica-alumina-magnesia and silica-magnesia-zirconia.

It may be desirable to provide at least a part of the foregoing matrix materials in colloidal form so as to facilitate extrusion of the bound catalyst components(s).

The relative proportions of finely divided crystalline material and matrix material may vary widely, with the crystal content ranging from about 1 to about 90 percent by weight and more usually, particularly when the composite, in the range of about 10 to about 80 weight percent of the composite.

The metal component may be introduced in to the catalyst by exchange, impregnation or mixing when the crystalline material is in the bound or unbound condition but normally it is preferred to add the metal to the bound catalyst.

The size of the pores of the crystalline materials is such that the spatiospecific selectivity with respect to transition state species is minimized in reactions such as cracking (Chen et al., "Shape Selective Catalysis in Industrial Applications", 36 CHEMICAL INDUSTRIES, pgs. 41–61 (1989) to which reference is made for a discussion of the factors affecting shape selectivity). Diffusional limitations are also minimized as a result of the very large pores in the present materials. For these reasons, the crystalline material is capable of catalyzing reactions which occur in the presence of acidic sites on the surface of the catalyst and which involve reactants, products or transitional state species which have large molecular sizes, too great for undergoing similar reactions with conventional large pore size solid catalysts, for example, large pore size zeolites such as zeolite X, Y, L, ZSM-4, ZSM-18, and ZSM-20. The present catalysts are therefore particularly useful for reactions with high-boiling hydrocarbons present; processes with high boiling feeds such as gas oils, residual fractions, lube boiling range fractions and the like are therefore particularly amenable to processing by the use of the present catalysts since feeds of this kind usually include significant quantities of molecules with bulky configurations which do not readily enter the pore structures of catalytic materials with smaller pore sizes or which are diffusion-restricted even if they are able to obtain access to the internal pore structure.

Thus, the present catalytic compositions containing the metal component will catalyze reactions such as hydrocracking, and other conversion reactions mediated by bifunctional catalysts with both acidic and hydrogenation-dehydrogenation functionality, as referred to above. The catalysts are particularly useful for processing hydrocarbon fractions obtained from petroleum refining, using hydrocarbon feeds of varying molecular sizes, but with particular applicability to feeds with large molecular sizes such as highly aromatic hydrocarbons with substituted or unsubstituted polycyclic aromatic components, bulky naphthenic compounds or highly substituted compounds with bulky steric configurations, e.g. molecular sizes of about 13 Angstroms or more, or with fractions which contain long-chain components which would normally create diffusion limitations. Such feeds typically include residual fractions i.e. non-distillable fractions, and high boiling fractions such as fractions boiling above about 650° F. such as lube fractions.

The processes using the catalysts will be carried out under the conditions normally appropriate to the reaction using conventional catalysts such as zeolites. Thus, processes involving a reduction in molecular weight by the cracking of hydrocarbons or substituted hydrocarbons will be carried out at elevated temperatures typically above about 150° C. and usually above about 200° or 300° C. Hydrocracking, for example, may suitably be conducted at a temperature of from about 350° C. to about 450° C., a pressure of from about 100 psig to about 3000 psig, and a weight hourly space velocity of from about 0.1 $hr^{-1}$ to about 10 $hr^{-1}$, with a hydrogen/hydrocarbon molar ratio of from about 0.1 to about 100. Exothermic processes such as hydrogenation and other processes where the predominant reaction is hydrogenation (hydrotreating, hydrofinishing), will normally be carried out at temperatures somewhat lower than those used in hydrocracking in order to favor the hydrogenation reactions which are thermodynamically favored by lower temperatures. Endothermic processes, like hydrocracking, are favored by rather higher temperatures; reforming, for example, will normally use temperatures of about 450° to 510° C., as is conventional.

The present compositions may also be used for selective conversion of inorganic compounds such as oxides of nitrogen in mixtures of gases which contain nitrogen oxides ($NO_x$), for example, industrial exhaust gases and the gases formed during the oxidative regeneration of catalysts used in the processing of hydrocarbons, especially in catalytic cracking operations. The $NO_x$ reduction reaction is favored by the presence of metals such as vanadium, titanium and for this reaction, the presence of these metals is preferred.

The $NO_x$ reduction is suitably conducted by passing the gas containing the oxides of nitrogen over the catalyst at an elevated temperature, typically at least 200° C., and usually within the range of 200° to 600° C. The gas mixture may be mixed with ammonia to promote reduction of the oxides of nitrogen and pre-mixing may be conducted at a temperature of up to about 200° C. The amount of ammonia which is mixed with the gas mixture is typically within the range of 0.75 to 1.25 the stoichiometric amount, which itself varies according to the ratio of the different oxides of nitrogen in the gas mixture, as shown by the equations:

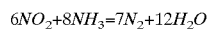

$6NO_2+8NH_3=7N_2+12H_2O$

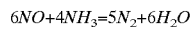

$6NO+4NH_3=5N_2+6H_2O$

The crystalline catalytic compositions of matter may also be used for the reduction of oxides of nitrogen in gaseous mixtures in the presence of other reducing agents such as carbon or carbon monoxide. Reduction of the oxides of nitrogen in this way is of particular utility in the regeneration of fluid catalytic cracking (FCC) catalysts, since regeneration under appropriate conditions will produce the required concentrations of carbon monoxide which may then be used to reduce the proportion of $NO_x$ in the regeneration gases in the presence of the catalyst. The porous crystalline material may be used in a matrixed or unmatrixed form for this purpose and may suitably be formed into extrudates, pellets or other shapes to permit the passage of gases over the catalyst with the minimum pressure drop.

The use of an ultra-large pore molecular sieve for hydrocracking, especially at low to moderate hydrogen pressure, provides an attractive option for obtaining kerosene and distillate selectivities which compare to state-ofthe-art amorphous based catalysts. Benefits of utilizing these catalysts in processes of this kind include an increase in bottoms quality and a potential increase in stability, since molecular sieves have been shown to be more stable than amorphous catalysts. In addition, the very high surface area possessed by the present mesoporous supports materials is of especial benefit in fuels hydrocracking where the catalyst needs a high degree of acidic functionality to provide the cracking function. In conventional zeolitic hydrocracking catalysts, this would be provided by a high zeolite loading in the catalyst but for the fact that this would reduce the amount of matrix material available to support the metal function. The high surface area of the mesoporous supports, however, enables high metal loadings to be readily accommodated while still providing adequate acidic functionality.

Examples 1 to 19 below illustrate the preparation of the crystalline materials. In the examples, whenever sorption data are set forth for comparison of sorptive capacities for water, cyclohexane, benzene and/or n-hexane, they are Equilibrium Adsorption values determined as follows:

A weighed sample of the adsorbent, after calcination at about 540° C. for at least about 1 hour and other treatment, if necessary, to remove any pore blocking contaminants, is contacted with the desired pure adsorbate vapor in an adsorption chamber. The increase in weight of the adsorbent is calculated as the adsorption capacity of the sample in terms of grams/100 grams adsorbent based on adsorbent weight after calcination at about 540° C. The present composition exhibits an equilibrium benzene adsorption capacity at 50 Torr and 25° C. of greater than about 15 grams/100 grams, particularly greater than about 17.5 g/100 g/and more particularly greater than about 20 g/100 g.

A preferred way to do this is to contact the desired pure adsorbate vapor in an adsorption chamber evacuated to less than 1 mm at conditions of 12 Torr of water vapor, 40 Torr of n-hexane or cyclohexane vapor, or 50 Torr of benzene vapor, at 25° C. The pressure is kept constant (within about ±0.5 mm) by addition of adsorbate vapor controlled by a manostat during the adsorption period. As adsorbate is adsorbed by the new crystal, the decrease in pressure causes the manostat to open a valve which admits more adsorbate vapor to the chamber to restore the above control pressures. Sorption is complete when the pressure change is not sufficient to activate the manostat.

Another way of doing this for benzene adsorption data is on a suitable thermogravimetric analysis system, such as a computer-controlled 990/951 duPont TGA system. The adsorbent sample is dehydrated (physically sorbed water removed) by heating at, for example, about 350° C. or 500° C. to constant weight in flowing helium. If the sample is in as-synthesized form, e.g. containing organic directing agents, it is calcined at about 540° C. in air and held to constant weight instead of the previously described 350° C. or 500° C. treatment. Benzene adsorption isotherms are measured at 25° C. by blending a benzene saturated helium gas stream with a pure helium gas stream in the proper proportions to obtain the desired benzene partial pressure. The value of the adsorption at 50 Torr of benzene is taken from a plot of the adsorption isotherm.

In the examples, percentages are by weight unless otherwise indicated.

EXAMPLE 1

One hundred grams of cetyltrimethylammonium (CTMA) hydroxide solution, prepared by contacting a 29 wt. % N,N,N- trimethyl-1-hexadecanammonium chloride solution with a hydroxide-for-halide exchange resin, was combined with 100 grams of an aqueous solution of tetramethylammonium (TMA) silicate (10% silica) with stirring. Twenty-five grams of HiSil, a precipitated hydrated silica containing about 6 wt. %, free water and about 4.5 wt. % bound water of hydration and having an ultimate particle size of about 0.02 micron, was added. The resulting mixture was placed in a polypropylene bottle, which was kept in a steam box at 95° C. overnight. The mixture had a composition in terms of moles per mole $Al_2O_3$:

2.7 moles $Na_2O$ 392 moles $SiO_2$ 35.7 moles $(CTMA)_2O$ 61.7 moles $(TMA)_2O$ 6231 moles $H_2O$ The resulting solid product was recovered by filtration and dried in air at ambient temperature. The product was then calcined at 540° C. for 1 hour in nitrogen, followed by 6 hours in air.

The calcined product proved to have a surface area of 475 $m^2$/g and the following equilibrium adsorption capacities in grams/100 grams:

| | |
|---|---|
| $H_2O$ | 8.3 |
| Cyclohexane | 22.9 |
| n-Hexane | 18.2 |
| Benzene | 21.5 |

The product of this example may be characterized by X-ray diffraction as including a very strong relative intensity line at 37.8±2.0 Å d-spacing, and weak lines at 21.6±1.0 and 19.2±1.0 Å. Transmission electron microscopy (TEM) produced images of a hexagonal arrangement of uniform pores and hexagonal electron diffraction pattern with a $d_{100}$ value of about 39 Å.

EXAMPLE 2

One hundred grams of cetyltrimethylammonium (CTMA) hydroxide solution prepared as in Example 1 was combined with 100 grams of an aqueous solution of tetramethylammonium (TMA) hydroxide (25%) with stirring. Twenty-five grams of HiSil, a precipitated hydrated silica containing about 6 wt. % free water and about 4.5 wt. % bound water of hydration and having an ultimate particle size of about 0.02 micron, was added. The resulting mixture was placed in a static autoclave at 150° C. overnight. The mixture had a composition in terms of moles per mole $Al_2O_3$:

2.7 moles $Na_2O$ 291 moles $SiO_2$ 35.7 moles $(CTMA)_2O$ 102 moles $(TMA)_2O$ 6120 moles $H_2O$ The resulting solid product was recovered by filtration and dried in air at ambient temperature. The product was then calcined at 540° C. for 1 hour in nitrogen, followed by 6 hours in tin air.

The calcined product proved to have a surface area of 993 $m^2$/g and the following equilibrium adsorption capacities in grams/100 grams:

| | |
|---|---|
| $H_2O$ | 7.1 |
| Cyclohexane | 47.2 |
| n-Hexane | 36.2 |
| Benzene | 49.5 |

The X-ray diffraction pattern of the calcined product may be characterized as including a very strong relative intensity line at 39.3±2.0 Å d-spacing, and weak lines at 22.2±1.0 and 19.4±1.0 Å. TEM indicated that the product contained the ultra-large pore material.

A portion of the above product was then contacted with 100% steam at 1450° F. for two hours. The surface area of the steamed material was measured to be 440 m²/g, indicating that about 45% was retained following severe steaming.

Another portion of the calcined product of this example was contacted with 100% steam at 1250° F. for two hours. The surface area of this material was measured to be 718 m²/g, indicating that 72% was retained after steaming at these conditions.

EXAMPLE 3

Water, cetyltrimethylammonium hydroxide solution prepared as in Example 1, aluminum sulfate, HiSil and an aqueous solution of tetrapropylammonium (TPA) bromide (35%) were combined to produce a mixture having a composition in terms of moles per mole $Al_2O_3$:

0.65 moles $Na_2O$
65 moles $SiO_2$
8.8 moles $(CTMA)_2O$
1.22 moles $(TPA)_2O$
1336 moles $H_2O$ The resulting mixture was placed in a polypropylene bottle, which was kept in a steam box at 95° C. for 192 hours. The sample was then cooled to room temperature and combined with (TMA hydroxide solution prepared as in Example 1 and TMA hydroxide (25% by weight) in the weight ratio of 3 parts mixture, 1 part CTMA hydroxide and 2 parts TMA hydroxide. The combined mixture was then placed in a polypropylene bottle and kept in a steam box at 95° C. overnight. The combined mixture had a composition in terms of moles per mole $Al_2O_3$:

0.65 moles $Na_2O$
65 moles $SiO_2$
15 moles $(CTMA)_2O$
1.22 moles $(TPA)_2O$
35.6 moles $(TMA)_2O$
2927 moles $H_2O$ The resulting solid product was recovered by filtration and dried in air at ambient temperature. The product was then calcined at 540° C. for 1 hour in nitrogen, followed by 6 hours in air.

The calcined product proved to have a surface area of 1085 m²/g and the following equilibrium adsorption capacities in grams/100 grams:

| | |
|---|---|
| $H_2O$ | 11.5 |
| Cyclohexane | >50 |
| n-Hexane | 39.8 |
| Benzene | 62 |

The X-ray diffraction pattern of the calcined product of this example may be characterized as including a very strong relative intensity line at 38.2±2.0 Å d-spacing, and weak lines at 22.2±1.0 and 19.4±1.0 Å. TEM indicated the product contained the ultra-large pore material.

EXAMPLE 4

Two hundred grams of cetyltrimethylammonium (CTMA) hydroxide solution prepared as in Example 1 was combined with 2 grams of Catapal alumina (alpha-alumina monohydrate, 74% alumina) and 100 grams of an aqueous solution of tetramethylammonium (TMA) silicate (10% silica) with stirring. Twenty-five grams of HiSil, a precipitated hydrated silica containing about 6 wt. % free water and about 4.5 wt. % bound water of hydration and having an ultimate particle size of about 0.02 micron, was added. The resulting mixture was placed in a static autoclave at 150° C. for 48 hours. The mixture had a composition in terms of moles per mole $Al_2O_3$:

0.23 moles $Na_2O$
33.2 moles $SiO_2$
6.1 moles $(CTMA)_2O$
5.2 moles $(TMA)_2O$
780 moles $H_2O$ The resulting solid product was recovered by filtration and dried in air at ambient temperature. The product was then calcined at 540° C. for 1 hour in nitrogen, followed by 6 hours in air.

The calcined product proved to have a surface area of 1043 m²/g and the following equilibrium adsorption capacities in grams/100 grams:

| | |
|---|---|
| $H_2O$ | 6.3 |
| Cyclohexane | >50 |
| n-Hexane | 49.1 |
| Benzene | 66.7 |

The X-ray diffraction pattern of the calcined product of this example may be characterized as including a very strong relative intensity line at 40.8±2.0 Å d-spacing, and weak lines at 23.1±1.0 and 20.1±1.0 Å. TEM indicated that the product contained the ultra-large pore material.

EXAMPLE 5

Two-hundred sixty grams of water was combined with 77 grams of phosphoric acid (85%), 46 grams of Catapal alumina (74% alumina), and 24 grams of pyrrolidine (Pyr) with stirring. This first mixture was placed in a stirred autoclave and heated to 150° C. for six days. The material was filtered, washed and air-dried. Fifty grams of this product was slurried with 200 grams of water and 200 grams of cetyltrimethylammonium hydroxide solution prepared as in Example 1. Four hundred grams of an aqueous solution of tetraethylammonium silicate (10% silica) was then added to form a second mixture which was placed in a polypropylene bottle and kept in a steam box at 95° C. overnight. The first mixture had a composition in terms of moles per mole $Al_2O_3$:

1.0 moles $P_2O_5$
0.51 moles $(Pyr)_2O$
47.2 moles $H_2O$

The resulting solid product was recovered by filtration and dried in air at ambient temperature. The product was then calcined at 540° C. for 1 hour in nitrogen, followed by 6 hours in air.

The calcined product proved to have a surface area of 707 m²/g and the following equilibrium adsorption capacities in grams/100 grams:

| | |
|---|---|
| $H_2O$ | 33.2 |
| Cyclohexane | 19.7 |
| n-Hexane | 20.1 |
| Benzene | 23.3 |

The X-ray diffraction pattern of the calcined product may be characterized as including a very strong relative intensity line at 25.4±1.5 Å d-spacing. TEM indicated the product contained the present ultra-large pore material (see Example 23).

EXAMPLE 6

A solution of 1.35 grams of NaAlO$_2$ (43.5% Al$_2$O$_3$, 30% Na$_2$O) dissolved in 45.2 grams of water was mixed with 17.3 grams of NaOH, 125.3 grams of colloidal silica (40%, Ludox HS-40) and 42.6 grams of 40% aqueous solution of tetraethylammonium (TEA) hydroxide. After stirring overnight, the mixture was heated for 7 days in a steam box (95° C.). Following filtration, 151 grams of this solution was mixed with 31 grams of cetyltrimethylammonium hydroxide solution prepared as in Example 1 and stored in the steam box at 95° C. for 13 days. The mixture had the following relative molar composition:

0.25 moles Al$_2$O$_3$ 10 moles Na$_2$O 36 moles SiO$_2$ 0.95 moles (CTMA)$_2$O 2.5 moles (TEA)$_2$O 445 moles H$_2$O The resulting solid product was recovered by filtration and washed with water and ethanol. The product was then calcined at 540° C. for 1 hour in nitrogen, followed by 6 hours in air.

The calcined product composition included 0.14 wt. % Na, 68.5 wt. % SiO$_2$ and 5.1 wt. % Al$_2$O$_3$, and proved to have a benzene equilibrium adsorption capacity of 58.6 grams/100 grams.

The X-ray diffraction pattern of the calcined product may be characterized as including a very strong relative intensity line at 31.4±1.5 Å d-spacing. TEM indicated that the product contained the present ultra-large pore material.

EXAMPLE 7

A mixture of 300 grams of cetyltrimethylammonium (CTMA) hydroxide solution prepared as in Example 1 and 41 grams of colloidal silica (40%, Ludox HS-40) was heated in a 600 cc autoclave at 150° C. for 48 hours with stirring at 200 rpm. The mixture has a composition in terms of moles per mole SiO$_2$:

0.5 mole (CTMA)$_2$O 46.5 moles H$_2$O

The resulting solid product was recovered by filtration, washed with water, then calcined at 540° C. for 1 hour in nitrogen, followed by 10 hours in air.

The calcined product composition included less than 0.01 wt. % Na, about 98.7 wt. % SiO$_2$ and about 0.01 wt. % Al$_2$O$_3$, and proved to have a surface area of 896 m$^2$/g. The calcined product had the following equilibrium adsorption capacities in grams/100 grams:

| H$_2$O | 8.4 |
|---|---|
| Cyclohexane | 49.8 |
| n-Hexane | 42.3 |
| Benzene | 55.7 |

The X-ray diffraction pattern of the calcined product of this example may be characterized as including a very strong relative intensity line at 40.0±2.0 Å d-spacing and a weak line at 21.2±1.0 Å. TEM indicated that the product of this example contained at least three separate phases, one of which was the ultra-large pore material.

EXAMPLE 8

A mixture of 150 grams of cetyltrimethylammonium (CTMA) hydroxide solution prepared as in Example 1 and 21 grams of colloidal silica (40%, Ludox HS-40) with an initial pH of 12.64 was heated in a 300 cc autoclave at 150° C. for 48 hours with stirring at 200 rpm. The mixture had a composition in terms of moles per mole SiO$_2$:

0.5 mole (CTMA)$_2$O 46.5 moles H$_2$O

The resulting solid product was recovered by filtration, washed with water, then calcined at 540° C. for 6 hours in air.

The calcined product composition was measured to include 0.01 wt. % Na, 93.2 wt. % SiO$_2$ and 0.016 wt. % Al$_2$O$_3$, and proved to have a surface area of 992 m$^2$/g and the following equilibrium adsorption capacities in grams/100 grams:

| H$_2$O | 4.6 |
|---|---|
| Cyclohexane | >50 |
| n-Hexane | >50 |
| Benzene | 62.7 |

The X-ray diffraction pattern of the calcined product may be characterized as including a very strong relative intensity line at 43.6±2.0 Å d-spacing and weak lines at 25.1±1.5 and 21.7±1.0 Å. TEM indicated that the product contained the ultra-large pore material.

EXAMPLE 9

Sodium aluminate (4.15 g) was added slowly into a solution containing 16 g of myristyltrimethylammonium bromide (C$_{14}$TMABr) in 100 g of water. Tetramethylammonium silicate (100 g—10% SiO$_2$), HiSil (25 g) and tetramethylammonium hydroxide (14.2 g—25% solution) were then added to the mixture. The mixture was crystallized in an autoclave at 120° C. with stirring for 24 hours.

The product was filtered, washed and air dried. Elemental analysis showed the product contained 53.3 wt % SiO$_2$, 3.2 wt % Al$_2$O$_3$, 15.0 wt % C, 1.88 wt % N, 0.11 wt % Na and 53.5 wt % ash at 1000° C. The X-ray diffraction pattern of the material after calcination at 540° C. for 1 hour in N$_2$ and 6 hours in air includes a very strong relative intensity line at 35.3±2.0 Å d-spacing and weak lines at 20.4±1.0 and 17.7±1.0 Å d-spacing. TEM indicated that the product contained the ultra-large pore material.

The washed product, having been exchanged with 1N ammonium nitrate solution at room temperature, then calcined, proved to have a surface area of 827 m$^2$/g and the following equilibrium adsorption capacities in g/100 g anhydrous sorbent:

| H$_2$O | 30.8 |
|---|---|
| Cyclohexane | 33.0 |
| n-Hexane | 21.9 |
| Benzene | 40.7 |

EXAMPLE 10

Sodium aluminate (8.3 g) was added slowly into a solution containing 184 g of dodecyltrimethylammonium hydroxide (C$_{12}$TMAOH, 50%) solution diluted with 480 g of water. UltraSil™ (50 g) and an aqueous solution of tetramethylammonium silicate (200 g—10% SiO$_2$) and tetramethylammonium hydroxide (26.38 g—25% solution) were then added to the mixture. The mixture was crystallized in an autoclave at 100° C. with stirring for 24 hours.

The product was filtered, washed and air dried. After calcination at 540° C. for 1 hour in N$_2$ and 6 hours in air, the X-ray diffraction pattern includes a very strong relative intensity line at 30.4±1.5 Å d-spacing and weak lines at 17.7±1.0 and 15.3±1.0 Å d-spacing. TEM indicated that the product contained the ultra-large pore material.

The washed product, having been exchanged with 1N ammonium nitrate solution at room temperature, then calcined, proved to have a surface area of 1078 m$^2$/g and the following equilibrium adsorption capacities in g/100 g anhydrous sorbent:

| | |
|---|---|
| $H_2O$ | 32.6 |
| Cyclohexane | 38.1 |
| n-Hexane | 33.3 |
| Benzene | 42.9 |

EXAMPLE 11

A solution of 4.9 grams of NaAlO$_2$ (43.5 % Al$_2$O$_3$, 30% NaO$_2$) in 37.5 grams of water was mixed with 46.3 cc of 40% aqueous tetraethylammonium hydroxide solution and 96 grams of colloidal silica (40%, Ludox HS-40). The gel was stirred vigorously for 0.5 hour, mixed with an equal volume (150 ml) of cetyltrimethylammonium hydroxide solution prepared as in Example 1 and reacted at 100° C. for 168 hours. The mixture had the following composition in terms of moles per mole Al$_2$O$_3$:

1.1 moles Na$_2$O
30.6 moles SiO$_2$
3.0 moles (TEA)$_2$O
3.25 moles (CTMA)$_2$O
609 moles H$_2$O The resulting solid product was recovered by filtration, washed with water then calcined at 540° C. for 16 hours in air. The calcined product proved to have a surface area of 1352 m$^2$/g and the following equilibrium adsorption capacities in grams/100 grams:

| | |
|---|---|
| $H_2O$ | 23.6 |
| Cyclohexane | >50 |
| n-Hexane | 49 |
| Benzene | 67.5 |

The X-ray diffraction pattern of the calcined product may be characterized as including a very strong relative intensity line at 38.5±2.0 Å d-spacing and a weak line at 20.3±1.0 Å. TEM indicated that the product contained the ultra-large pore material.

EXAMPLE 12

Two hundred grams of cetyltrimethylammonium (CTMA) hydroxide solution prepared as in Example 1 was combined with 4.15 grams of sodium aluminate and 100 grams of aqueous tetramethylammonium (TMA) silicate solution (10% silica) with stirring. Twenty-five grams of HiSil, a precipitated hydrated silica containing about 6 wt. % free water and about 4.5 wt. % bound water of hydration and having an ultimate particle size of about 0.02 micron, was added. The resulting mixture was placed in a static autoclave at 150° C. for 24 hours. The mixture had a composition in terms of moles per mole Al$_2$O$_3$:

1.25 moles Na$_2$O
27.8 moles SiO$_2$
5.1 moles (CTMA)$_2$O
4.40 moles (TMA)$_2$O
650 moles H$_2$O The resulting solid product was recovered by filtration and dried in air at ambient temperature. The product was then calcined at 540° C. for 1 hour in nitrogen, followed by 6 hours in air. TEM indicated that this product contained the ultra-large pore material. The X-ray diffraction pattern of the calcined product of this example can be characterized as including a very strong relative intensity line at 44.2±2.0 Å d-spacing and weak lines at 25.2±1.5 and 22.0±1.0 Å.

The calcined product proved to have a surface area of 932 m$^2$/g and the following equilibrium adsorption capacities in grams/100 grams:

| | |
|---|---|
| $H_2O$ | 39.3 |
| Cyclohexane | 46.6 |
| n-Hexane | 37.5 |
| Benzene | 50 |

EXAMPLE 13

Two hundred grams of cetyltrimethylammonium (CTMA) hydroxide solution prepared as in Example 1 was combined with 4.15 grams of sodium aluminate and 100 grams of aqueous tetramethylammonium (TMA) silicate solution (10% silica) with stirring. Twenty-five grams of HiSil, a precipitated hydrated silica containing about 6 wt. % free water and about 4.5 wt. % bound water of hydration and having an ultimate particle size of about 0.02 micron, was added. The resulting mixture was placed in a steam box at 100° C. for 48 hours. The mixture had a composition in terms of moles per mole Al$_2$O$_3$:

1.25 moles Na$_2$O
27.8 moles SiO$_2$
5.1 moles (CTMA)$_2$O
4.4 moles (TMA)$_2$O
650 moles H$_2$O The resulting solid product was recovered by filtration and dried in air at ambient temperature. The product was then calcined at 540° C. for 1 hour in nitrogen, followed by 6 hours in air. The calcined product proved to have the following equilibrium adsorption capacities in grams/100 grams:

| | |
|---|---|
| $H_2O$ | 35.2 |
| Cyclohexane | >50 |
| n-Hexane | 40.8 |
| Benzene | 53.5 |

The X-ray diffraction pattern of the calcined product may be characterized as including a very strong relative intensity line at 39.1±2.0 Å d-spacing and weak lines at 22.4±1.0 and 19.4±1.0 Å. TEM indicated that this product contained the ultra-large pore material.

EXAMPLE 14

A mixture of 125 grams of 29% CTMA chloride aqueous solution, 200 grams of water, 3 grams of sodium aluminate (in 50 grams H$_2$O ), 65 grams of Ultrasil, amorphous precipitated silica available from PQ Corporation, and 21 grams NaOH (in 50 grams H$_2$O ) was stirred thoroughly and crystallized at 150° C. for 168 hours. The reaction mixture had the following relative molar composition in terms of moles per mole silica:

0.10 moles (CTMA)$_2$O 21.89 moles $H_2O$ 0.036 moles $NaAlO_2$ 0.53 moles NaOH

The solid product was isolated by filtration, washed with water, dried for 16 hours at room temperature and calcined at 540° C. for 10 hours in air. The calcined product proved to have a surface area of 840 m²/g, and the following equilibrium adsorption capacities in grams/100 grams:

| | |
|---|---|
| $H_2O$ | 15.2 |
| Cyclohexane | 42.0 |
| n-Hexane | 26.5 |
| Benzene | 62 |

The X-ray diffraction pattern of the calcined product may be characterized as including a very strong relative intensity line at 40.5±2.0 Å d-spacing. TEM indicated that the product contained the ultra-large pore material.

EXAMPLE 15

To make the primary template mixture for this example, 240 grams of water was added to a 92 gram solution of 50% dodecyltrimethylammonium hydroxide, 36% isopropyl alcohol and 14% water such that the mole ratio of Solvent/$R_{2/f}O$ was 155. The mole ratio of $H_2O/R_{2/f}O$ in this mixture was 149 and the IPA/$R_{2/f}O$ mole ratio was 6. To the primary template mixture was added 4.15 grams of sodium aluminate, 25 grams of HiSil, 100 grams of aqueous tetramethylammonium silicate solution (10% $SiO_2$) and 13.2 grams of 25% aqueous tetramethylammonium hydroxide solution. The mole ratio of $R_{2/f}O/(SiO_2+Al_2O_3)$ was 0.28 for the mixture.

This mixture was stirred at 25° C. for 1 hour. The resulting mixture was then placed in an autoclave at 100° C. and stirred at 100 rpm for 24 hours. The mixture in the autoclave had the following relative molar composition in terms of moles per mole $SiO_2$:

0.05 mole $Na_2O$ 0.036 mole $Al_2O_3$ 0.18 mole $(C_{12}TMA)_2O$ 0.12 mole $(TMA)_2O$ 36.0 moles $H_2O$ 1.0 mole IPA The resulting solid product was recovered by filtration, washed with water and dried in air at ambient temperature. The product was then calcined at 540° C. for 1 hour in nitrogen, followed by 6 hours in air.

The calcined product proved to have a surface area of 1223 m²/g and the following equilibrium adsorption capacities in grams/100 grams:

| | |
|---|---|
| $H_2O$ | 25.5 |
| Cyclohexane | 41.1 |
| n-Hexane | 35.1 |
| Benzene | 51 |

The X-ray diffraction pattern of the calcined product may be characterized as including a very strong relative intensity line at 30.8±1.5 Å d-spacing and weak lines at 17.9±1.0 and 15.5±1.0 Å. TEM indicated this product to contain the ultra-large pore material.

EXAMPLE 16

A 50.75 gram quantity of decyltrimethylammonium hydroxide (prepared by contacting a ca. 29 wt. % solution of decyltrimethylammonium bromide with a hydroxide-for-halide exchange resin) was combined with 8.75 grams of tetraethylorthosilicate. The mixture was stirred for about 1 hour and then transferred to a polypropylene jar which was then placed in a steambox for about 24 hours. The mixture had a composition in terms of moles per mole $SiO_2$:

0.81 mole $(C_{10}TMA)_2O$ 47.6 moles $H_2O$

The resulting solid product was filtered and washed several times with warm (60–70° C.) distilled water and with acetone. The final product was calcined to 538° C. in $N_2$/air mixture and then held in air for about 8 hours. The calcined product proved to have a surface area of 915 m²/g and an equilibrium benzene adsorption capacity of 35 gram/100 grams. Argon physisorption data indicated an argon uptake of 0.34 cc/grain, and a pore size of 15 Å.

The X-ray diffraction pattern of the calcined product of this example may be characterized as including a very strong relative intensity line at 27.5±1.5 Å d-spacing and weak lines at 15.8±1.0 and 13.7±1.0 Å. TEM indicated that the product of this example contained the ultra-large pore material.

EXAMPLE 17

To eighty grams of cetyltrimethylammonium hydroxide (CTMAOH) solution prepared as in Example 1 was added 1.65 grams of $NaAlO_2$. The mixture was stirred at room temperature until the $NaAlO_2$ was dissolved. To this solution was added 40 grams of aqueous tetramethylammonium (TMA) silicate solution (10 wt. % $SiO_2$), 10 grams of HiSil, 200 grams of water and 70 grams of 1,3,5-trimethylbenzene (mesitylene). The resulting mixture was stirred at room temperature for several minutes. The gel was then loaded into a 600 cc autoclave and heated at 105° C. for sixty-eight hours with stirring at 150 rpm. The mixture had a composition in terms of moles per mole $Al_2O_3$:

1.25 moles $Na_2O$ 27.8 moles $SiO_2$ 5.1 moles $(CTMA)_2O$ 2.24 moles $(TMA)_2O$ 2256 moles $H_2O$ 80.53 moles 1,3,5-trimethylbenzene The resulting product was filtered and washed several times with warm (60°–70° C.) distilled water and with acetone. The final product was calcined to 538° C. in $N_2$/air mixture and then held in air for about 10 hours. The calcined product proved to have an equilibrium benzene adsorption capacity of >25 grams/100 grams.

The X-ray diffraction pattern of the calcined product may be characterized as including a broad, very strong relative intensity line at about 102 Å d-spacing, but accurate positions of lines in the extreme low angle region of the X-ray diffraction pattern are very difficult to determine with conventional X-ray diffractometers. Furthermore, finer collimating slits were required to resolve a peak at this low 2-theta angle. The slits used in this example, starting at the X-ray tube, were 0.1, 0.3, 0.5 and 0.2 mm, respectively. TEM indicated that the product of this example contained several materials with different $d_{100}$ values as observed in their electron diffraction patterns. These materials were found to possess $d_{100}$ values between about 85 Å d-spacing and about 120 Å d-spacing.

EXAMPLE 18

To eighty grams of cetyltrimethylammonium hydroxide (CTMAOH) solution prepared as in Example 1 was added 1.65 grams of NaAlO$_2$. The mixture was stirred at room temperature until the NaAlO$_2$ was dissolved. To this solution was added 40 grams of aqueous tetramethylammonium (TMA) silicate solution (10 wt. % SiO$_2$), 10 grams of HiSil, 200 grams of water and 120 grams of 1,3,5-trimethylbenzene (mesitylene). The resulting mixture was stirred at room temperature for several minutes. The gel was then loaded into a 600 cc autoclave and heated at 105° C. for ninety hours with stirring at 150 rpm. The mixture had a composition in terms of moles per mole Al$_2$O$_3$:

1.25 moles Na$_2$O
27.8 moles SiO$_2$
5.1 moles (CTMA)$_2$O
2.24 moles (TMA)$_2$O
2256 moles H$_2$O
132.7 moles 1,3,5-trimethylbenzene The resulting product was filtered and washed several times with warm (60°–70° C.) distilled water and with acetone. The final product was calcined to 538° C. in N$_2$/air mixture and then held in air for about 10 hours. The calcined product proved to have a surface area of 915 m$^2$/g and an equilibrium benzene adsorption capacity of >25 grams/100 grams. Argon physisorption data indicated an argon uptake of 0.95 cc/gram, and a pore size centered on 78 Å (Dollimore-Heal Method, see Example 19(b)), but running from 70 to greater than 105 Å. The X-ray diffraction pattern of the calcined product of this example may be characterized as having only enhanced scattered intensity in the very low angle region of the X-ray diffraction, where intensity from the transmitted incident X-ray beam is usually observed. However, TEM indicated that the product contained several materials with different d$_{100}$ values as observed in their electron diffraction patterns. These materials were found to possess d$_{100}$ values between about 85 Å d-spacing and about 110 Å d-spacing.

EXAMPLE 19

To eighty grams of cetyltrimethylammonium hydroxide (CTMAOH) solution prepared as in Example 1 was added 1.65 grams of NaAlO$_2$. The mixture was stirred at room temperature until the NaAlO$_2$ was dissolved. To this solution was added 40 grams of aqueous tetramethylammonium (TMA) silicate solution (10 wt. % SiO$_2$), 10 grams of HiSil, and 18 grams of 1,3,5-trimethylbenzene (mesitylene). The resulting mixture was stirred at room temperature for several minutes. The gel was then loaded into a 300 cc autoclave and heated at 105° C. for four hours with stirring at 150 rpm. The mixture had a composition in terms of moles per mole Al$_2$O$_3$:

1.25 moles Na$_2$O
27.8 moles SiO$_2$
5.1 moles (CTMA)$_2$O
2.24 moles (TMA)$_2$O
650 moles H$_2$O
19.9 moles 1,3,5-trimethylbenzene The resulting product was filtered and washed several times with warm (60°–70° C.) distilled water and with acetone. The final product was calcined to 538° C. in N$_2$/air mixture and then held in air for about 8 hours.

The calcined product proved to have a surface area of 975 m$^2$/g and an equilibrium benzene adsorption capacity of >40 grams/100 grams. Argon physisorption data indicated an argon uptake of 0.97 cc/gram, and a pore size of 63 Å (Dollimore-Heal Method), with the peak occurring at P/P$_0$=0.65.

The X-ray diffraction pattern of the calcined product of this example may be characterized as including a very strong relative intensity line at 63±5 Å d-spacing and weak lines at 36.4±2.0, 31.3±1.5 Å and 23.8±1.0 Å d-spacing. TEM indicated that the product of this example contained the ultra-large pore material.

EXAMPLE 20

Argon Physisorption Determination

To determine the pore diameters of the mesoporous products with pores up to about 60 Å in diameter, 0.2 gram samples of the products of Examples 1 through 17 were placed in glass sample tubes and attached to a physisorption apparatus as described in U.S. Pat. No. 4,762,010.

The samples were heated to 300° for 3 hours in vacuo to remove adsorbed water. Thereafter, the samples were cooled to 87° K. by immersion of the sample tubes in liquid argon. Metered amounts of gaseous argon were then admitted to the samples in stepwise manner as described in U.S. Pat. No. 4,762,010, column 20. From the amount of argon admitted to the samples and the amount of argon left in the gas space above the samples, the amount of argon adsorbed can be calculated. For this calculation, the ideal gas law and the calibrated sample volumes were used. (See also S. J. Gregg et al., *Adsorption, Surface Area and Porosity*, 2nd ed., Academic Press, 1982). In each instance, a graph of the amount adsorbed versus the relative pressure above the sample, at equilibrium, constitutes the adsorption isotherm. It is common to use relative pressures which are obtained by forming the ratio of the equilibrium pressure and the vapor pressure P$_0$ of the adsorbate at the temperature where the isotherm is measured. Sufficiently small amounts of argon were admitted in each step to generate 168 data points in the relative pressure range from 0 to 0.6. At least about 100 points are required to define the isotherm with sufficient detail.

The step (inflection) in the isotherm, indicates filling of a pore system. The size of the step indicates the amount adsorbed, whereas the position of the step in terms of P/P$_0$ reflects the size of the pores in which the adsorption takes place. Larger pores are filled at higher P/P$_0$. In order to better locate the position of the step in the isotherm, the derivative with respect to log (P/P$_0$) is formed. The adsorption peak (stated in terms of log (P/P$_0$)) may be related to the physical pore diameter (Å) by the following formula:

$$\log(P/P_o) = \frac{K}{d - 0.38}\left[\frac{S^4}{3(L - D/2)^3} - \frac{S^{10}}{9(L - D/2)^9} - \frac{S^4}{3(D/2)^3} + \frac{S^{10}}{9(D/2)^9}\right]$$

where d=pore diameter in nanometers, K=32.17, S=0.2446, L=d+0.19, and D=0.57.

This formula is derived from the method of Horvath and Kawazoe (G. Horvath et al., *J. Chem. Eng. Japan*, 16 (6) 470(1983)). The constants required for the implementation of this formula were determined from a measured isotherm of ALPO-5 and its known pore size. This method is particularly useful for microporous materials having pores of up to about 60 Å in diameter.

The results of this procedure for the samples from Examples 1 through 16 are tabulated below. The samples from Examples 10, 13 and 15 gave two separate peaks, believed to be the result of two separate ultra-large pore phases in the products.

| Examples | Pore Diameter, Å |
|---|---|
| 1 | 32.2 |
| 2 | 35.4 |
| 3 | 42.5 |
| 4 | 39.6 |
| 5 | 16.9 |
| 6 | 27.3 |
| 7 | 36.6 |
| 8 | 42.6 |
| 9 | 28.3 |
| 10 | 22.8, 30.8 |
| 11 | 36.8 |
| 12 | 36.1 |
| 13 | 35.0, 42.1 |
| 14 | 40.0 |
| 15 | 22.4, 30.4 |
| 16 | 15.0 |

By way of comparison, a commercially prepared sample of zeolite USY (equilibrium benzene sorption capacity of 20.7 grams/100 grams, X-ray diffraction pattern with all the lines of zeolite Y and with the highest d-spacing at about 14 Å) had a pore diameter of about 8.3 Å as determined by the above method.

The method of Horvath and Kawazoe for determining pore size from physisorption isotherms was intended to be applied to pore systems of up to 20 Å diameter; but with some care as above detailed, its use can be extended to pores of up to 60 Å diameter.

In the pore regime above 60 Å diameter, the Kelvin equation can be applied. It is usually given as:

$$\ln(P/P_0) = \frac{-2\gamma V}{r_k RT} \cos\theta$$

where:

$\gamma$=surface tension of sorbate

V=volume of sorbate $\theta$=contact angle (usually taken for practical reasons to be 0)

R=gas constant

T=absolute temperature $r_K$=capillary condensate (pore) radius $P/P_0$=relative pressure (taken from the physisorption isotherm)

The Kelvin equation treats adsorption in pore systems as a capillary condensation phenomenon and relates the pressure at which adsorption takes place to the pore diameter through the surface tension and contact angle of the adsorbate (in this case, argon). The principles upon which the Kelvin equation are based are valid for pores in the size range 50 to 1000 Angstrom diameter. Below this range the equation no longer reflects physical reality, since true capillary condensation cannot occur in smaller pores; above this range the logarithmic nature of the equation precludes obtaining sufficient accuracy for pore size determination.

The particular implementation of the Kelvin equation often chosen for measurement of pore size is that reported by Dollimore and Heal (D. Dollimore and G. R. Heal, *J. Applied Chem*, 14, 108 (1964)). This method corrects for the effects of the surface layer of adsorbate on the pore wall, of which the Kelvin equation proper does not take account, and thus provides a more accurate measurement of pore diameter. While the method of Dollimore and Heal was derived for use on desorption isotherms, it can be applied equally well to adsorption isotherms by simply inverting the data set.

Transmission Electron Microscopy

In order to illuminate the microstructure of materials by transmission electromicroscopy (TEM), samples must be thin enough for an electron beam to pass through them, generally about 500–1000 Å or so thick. The crystal morphology of the present materials usually required that they be prepared for study by ultramicrotomy. While time consuming, this technique of sample preparation is quite familiar to those skilled in the art of electron microscopy. The materials are embedded in a resin, in this case a commercially available low viscosity acrylic resin L.R. WHITE (hard), which is then cured at about 80° C. for about 1 ½ hours. Thin sections of the block are cut on an ultramicrotome using a diamond knife and sections in the thickness range 500–1000 Å are collected on fine mesh electron microscope support grids. For these materials, an LKB model microtome with a 45° C. diamond knife edge was used; the support grids were 400 mesh copper grids. After evaporation of a thin carbon coating on the sample to prevent charging in the microscope (light gray color on a white sheet of paper next to the sample in the evaporator), the samples are ready for examination in the TEM.

High resolution TEM micrographs show projections of structure along the direction that the sample is viewed. For this reason, it is necessary to have a sample in specific orientations to see certain details of the microstructure of the material. For crystalline materials, these orientations are most easily chosen by observing the electron diffraction pattern (EDP) that is produced simultaneously with the electron microscope image. Such EDPs are readily produced on modern TEM instruments using, e.g. the selected area field limiting aperture technique familiar to those skilled in the art of electron microscopy. When an EDP with the desired arrangement of diffraction spots is observed, the corresponding image of the crystal giving that EDP will reveal details of the microstructure along the direction of projection indicated by the EDP. In this way, different projections of a crystal's structure can be observed and identified using TEM.

In order to observe the salient features of the crystalline product, it is necessary to view the material in an orientation wherein the corresponding EDP gives a hexagonal arrangement of diffraction spots from a single individual crystal. If multiple crystals are present within the field limiting aperture, overlapping diffraction patterns will occur that can be quite difficult to interpret. The number of diffraction spots observed depends to a degree upon the regularity of the crystalline arrangement in the material, among other things. At the very least the inner ring of bright spots should be observed to obtain a good image. Individual crystals can be manipulated by specimen tilt adjustments on the TEM until this orientation is achieved. More often, it is easier to take advantage of the fact that the specimen contains many randomly oriented crystals and to simply search through the sample until a crystal giving the desired EDP (and hence orientation) is located. This latter technique was used to produce the electron micrographs.

Microtomed samples of materials from the Examples were examined by the techniques described above in a JEOL 200 CX transmission electron microscope operated at 200,000 volts with an effective 2 Å objective aperture in place. The instrument has a point-to-point resolution of 4.5 Å. Other experimental arrangements familiar to one skilled in the art of high resolution (phase contrast) TEM could be used to produce equivalent images provided care is taken to keep the objective lens on the underfocus (weak leans) side of the minimum contrast lens current setting.

EXAMPLE 21

A sample of MCM-41 (40 Å) was prepared in accordance with the method described below.

The following mixture (parts by weight—pbw) was charged to an autoclave:

| | |
|---|---|
| 83.7 pbw | Cetyltrimethylammonium (CTMA) hydroxide, prepared by contracting a 29 wt. % N,N,N-trimethyl-1-hexadecyl-ammonium chloride solution with a hydroxide-for-halide exchange resin |
| 1.7 pbw | Sodium aluminate, |
| 41.1 pbw | Tetramethylammonim silicate (10% aqueous solution), |
| 10.5 pbw | Precipitated hydrated silica (HiSil ™). |

The mixture was crystallized at 100° C. for 20 hrs. with stirring under autogeneous pressure. The resulting product was recovered by filtration and dried in air at ambient temperature. A sample of the product was calcined at 540° C. for 1 hour in nitrogen, followed by 6 hours in air for characterization.

The calcined product had a surface area of 1120 m2/g and the following equilibrium absorption capacities in grams/100 grams:

| | |
|---|---|
| $H_2O$ | 10.8 |
| Cyclohexane | >50 |
| n-hexane | >50 |
| Benzene | 67 |

The product was identified as MCM-41 with an X-ray diffraction pattern which included a very strong relative intensity line at 38.4±2.0 Å d-spacing, and weak lines at 22.6±1.0, 20.0±1.0, and 15.2±1.0 Å.

The MCM-41 crystalline product was exchanged with room temperature aqueous solutions of ammonium nitrate and subsequently dried overnight at 250° F. A portion of the resultant crystals was combined with Al2O3 to form a mixture of 65 parts, by weight MCM-41 and 35 parts alumina. Water was added to this mixture to allow the resulting catalyst to be formed into extrudates. The catalyst was activated by calcination at 950° F. in 5v/v/min of nitrogen for 6 hours followed by the replacement of the nitrogen with 5v/v/min of air. The calcination was completed by raising the temperature to 1000° F. and maintaining that temperature in 5v/v/min air for 18 hours. Nickel and tungsten were incorporated via incipient wetness coimpregnation using solutions of $Ni(NO_3)_2 \cdot 6H_2O$ and $(NH_4)_6H_2W_{12}O_{40} \cdot H_2O$. After drying overnight at 250° F., the extrudate was calcined in 5v/v/min air at 1000° F. for 3 hours. Physical and chemical properties of the NiW/MCM-41/Al2O3 catalyst are provided below:

| | |
|---|---|
| Nickel, wt % | 3.7 |
| Tungsten, wt % | 9.2 |
| Sodium, ppm | 200 |
| Surface Area, m2/g | 530 |
| Pore Volume, cc/g | 0.780 |
| Particle Density, g/cc | 0.883 |
| Real Density, g/cc | 2.837 |

EXAMPLE 22 catalyst of Example 21 was used as the hydrocracking catalyst in a DHC-2/NiW MCM-41 cascade reactor system. DHC-2 is a hydrotreating catalyst sold by UOP. The catalyst fill ratio was 4.08 g of DHC-2 and 6.40 g of NiW-MCM-41 to give an HDT/HDC weight ratio of 0.64, with a total catalyst volume of 20.2cc. The DHC-2 catalyst serves as a hydrotreating catalyst to reduce nitrogen and sulfur content before the oil is processed in the hydrocracking section of the reactor containing the NiW/MCM-41 catalyst which does the bulk of the boiling range conversion. The feed was a heavy vacuum gas oil from a Persian Gulf crude with the properties are listed in Table 1 below.

TABLE 1

| Properties of Persian Gulf VGO | |
|---|---|
| Hydrogen, wt % | 12.6 |
| Nitrogen, ppm | 650 |
| Basic Nitrogen, ppm | 198 |
| Sulfur, wt % | 2.3 |
| API Gravity | 22.6 |
| Pour Point, °F. | 90 |
| Composition, wt % | |
| Paraffins | 27.7 |
| Mononaphthenes | 8.3 |
| Polynaphthenes | 14.6 |
| Aromatics | 49.4 |
| Simulated Dist., Wt % | |
| IBP | 531 |
| 5 | 687 |
| 10 | 715 |
| 20 | 745 |
| 30 | 770 |
| 40 | 793 |
| 50 | 816 |
| 60 | 841 |
| 70 | 866 |
| 80 | 897 |
| 90 | 942 |
| 95 | 970 |
| EP | 1071 |

The process conditions were 1200 psig hydrogen pressure, 4500 SCFB hydrogen circulation and 0.5 LHSV. Severity was varied by adjusting reactor temperature from 720°–770° F. at constant LHSV. The temperatures of the hydrotreating and hydrocracking reactors were maintained at the same temperature for all runs.

The reactor severity is measured by 650° F.− boiling range conversion which is defined as:

$$650° \text{ F.− conversion} = \frac{650° \text{ F.+ in Feed (wt \%)} - 650° \text{ F.+ in Product (wt \%)}}{650° \text{ F.+ in Feed (wt \%)}}$$

The selectivities for kerosene (330°–440° F. fraction) and distillate (440°–650° F. fraction) are shown in tabular form for a conversion level of 45 wt %, in Table 2 below:

TABLE 2

| HDC of VGO BLEND (45 wt % Conversion) | |
|---|---|
| Catalyst | DHC-2/NiW-MCM-41 |
| Reactor Temp., °F. | 753 |
| Product Composition, wt % | |
| C1–C4 | 4.0 |
| C5–330 | 10.5 |
| 330–440 | 9.0 |
| 440–650 | 22.5 |

TABLE 2-continued

HDC of VGO BLEND
(45 wt % Conversion)

| Catalyst | DHC-2/NiW-MCM-41 |
|---|---|
| 650–750 | 18 |
| 750+ | 35 |
| H2 Cons, SCFB | 850 |

The Total Liquid Product (TLP) samples at the 43 wt % conversion were distilled to yield 730° F.+ bottoms material that was subsequently analyzed, with the results given in Table 3.

TABLE 3

Bottoms Properties at 43 wt % 650° F.+ Conversion

| 730° F.+ Properties | |
|---|---|
| Nitrogen, ppm | 3 |
| Mol. Weight | 388 |
| Pour Point, °F. | 90 |
| KV @ 100° C., cS | 4.804 |
| Composition, wt % | |
| Paraffins | 43.3 |
| Mononaphthenes | 19.3 |
| Polynaphthenes | 23.4 |
| Aromatics | 14.0 |
| Simulated Dist., Wt % | |
| IBP/5 | 701/731 |
| 10/50 | 745/817 |

The MCM-41 catalyst was highly effective in reducing the nitrogen level of the bottoms to a very low level of 3 ppm. Also, the degree of aromatic saturation for the MCM-41 catalyst was good: aromatics level dropped from 19.6 to 14.0 wt percent.

EXAMPLE 23

The following mixture (parts by weight) was charged to an autoclave:

| 48 parts | Cetyltrimethylammonium (CTNA) hydroxide solution, prepared by contacting a 29 wt. % N,N,N-trimethyl-1-hexadecyl-ammonium chloride solution with a hydroxide-for-halide exchange resin |
|---|---|
| 1 part | Sodium aluminate, |
| 24 parts | Tetramethylammonim silicate (10% aqueous solution), |
| 6 parts | Precipitated hydrated silica (HiSil ™ ). |

The mixture was crystallized at 100° C. for 20 hrs. with stirring under autogeneous pressure, and the resulting product was recovered by filtration and dried in air at ambient temperature. A sample of the product was calcined at 540° C. in nitrogen followed air.

The calcined product had a surface area of 1120 m2/g and the following equilibrium absorption capacities in grams/100 grams:

| $H_2O$ | 10.8 |
|---|---|
| Cyclohexane | >50 |
| n-hexane | >50 |
| Benzene | 67 |

The product exhibited a very strong relative intensity line at 38.4±2.0 Å d-spacing, and weak lines at 22.6±1.0, 20.0±1.0, and 15.2±1.0 Å.

An unbound Pt/H-MCM-41 catalyst containing 0.6 wt % platinum was prepared by subjecting the calcined product to ammonium exchange in buffered solution at pH=8 to remove sodium, followed by exchange with $Pt(NH_3)_4Cl_2$ in the presence of ammonium ions at pH 4–5, followed by drying and calcination. An amorphous silica-alumina catalyst containing 0.6 wt % platinum, comparable to commercial isomerization catalysts, was also prepared for comparison.

The catalyst was evaluated for paraffin isomerization using a micro unit equipped with a 12.5 mm downflow stainless steel reactor. A commercial $Pt/SiO_2-Al_2O_3$ catalyst was used for comparison. In a typical experiment, 10 cc of sized catalyst (14/24 mesh) were loaded into the reactor and reduced in hydrogen at 800° F. (427° C.) for two hours. The reactor was cooled to 450° F. (232° C.) and pressurized to 100 psig (790 kpa abs.) with hydrogen. N-hexane as feed was then introduced at 1 WHSV with a 2:1 mol:mol hydrogen cofeed. The product from the reactor was analyzed with an on-line gas chromatograph equipped with a 30 meter megabore DB-1 column.

The Pt/MCM-41 catalyst gave a higher yield of isoparaffins than the Pt/silica-alumina catalyst at equivalent n-hexane conversion and produced less cracked product at equivalent n-hexane conversion, demonstrating that the catalyst based on the ultra large pore material is more selective for isoparaffin when compared to the amorphous catalyst. The distribution of products for the two catalysts at 650° F. operating temperature are shown in Table 4 below.

TABLE 4

Isomerate Products at 650° F.

| Catalyst | Pt/MCM-41 | $Pt/SiO_2-Al_2O_3$ |
|---|---|---|
| Feed Rate (gm n-$C_6$/gm Cat/hr) | 1.0 | 1.0 |
| Hours On-Stream | 129 | 64 |
| Conversion, wt % | 74.6 | 78.6 |
| Product Distribution. wt % | | |
| $C_5-$ | 2.3 | 8.8 |
| n-Hexane | 25.4 | 21.4 |
| Methylpentanes | 53.7 | 49.9 |
| Dimethylbutanes | 18.2 | 18.5 |
| Methylcyclopentane | 0.2 | 0.5 |
| $C_7+$ | 0.2 | 0.9 |

EXAMPLE 24

Pt/MCM-41 Catalyst Preparation

A sample of MCM-41 (40 Å) was prepared in accordance with the method described in Example 21 above.

The MCM-41 crystalline product was exchanged with room temperature aqueous solutions of ammonium nitrate and subsequently dried overnight at 250° F. A portion of the resultant crystals was combined with $Al_2O_3$ (Versal 250 ™) to form a mixture of 65 parts, by weight MCM-41 and 35 parts alumina. Water was added to this mixture to allow the resulting catalyst to be formed into extrudates. The catalyst was activated by calcination at 950° F. in 5v/v/min of nitrogen for 6 hours followed by the replacement of the nitrogen with 5v/v/min of air. The calcination was completed by raising the temperature to 1000° F. and maintaining that temperature in 5v/v/min air for 18 hours.

The calcined extrudate was exchanged with a 0.0062M $Pt(NH_3)_4Cl_2$ solution, followed by washing, drying and calcination in air at 650° F. for three hours.

Pd/MCM-41 Catalyst Preparation

A sample of MCM-41 (40 Å) was prepared by a similar method to that described in Example 21 above but using 48 pbw cetyltrimethylammonium (CTMA) hydroxide, 1 pbw sodium aluminate, 24 pbw tetramethylammonium silicate (10% aqueous solution), and 6 pbw precipitated hydrated silica (HiSil ™). The mixture was crystallized at 100° C. for 20 hrs.

The MCM-41 crystalline product was formulated into a catalyst in the same way as the platinum-containing catalyst with the exception that the calcined catalyst was exchanged with aqueous $Pd(NH_3)_4Cl_2$ solution, followed by drying at room temperature for 4 hours and overnight at 250° F. before the final calcination.

A $Pd/SiO_2$ catalyst was made by impregnating silica spheres (Shell S-980 C 1.5) with a $Pd(NH_3)_4Cl_2$ solution using the incipient wetness method. The impregnated spheres were then dried at room temperature for 4 hours, followed by 250° F. overnight after which the catalyst was calcined in 5v/v/min air at 550° F. for 3 hours.

The three noble metal containing catalysts (Pt MCM-41/$Al_2O_3$, Pd MCM-41/$Al_2O_3$, Pd $SiO_2$) were evaluated for hydrogenating a polyalpha-olefin lubricant.

The properties of the three catalysts are summarized in Table 5 below.

TABLE 5

Catalyst Properties

| | Pd MCM-41[1] | Pt MCM-41[1] | Pd SiO2 |
|---|---|---|---|
| Metal Loading Wt % | | | |
| Pd | 0.83 | — | 0.84 |
| Pt | — | 0.54 | — |
| Surface Area, m²/g | 800 | 682 | 330 |
| Pore Volume, cc/g | 0.96 | 0.97 | 0.88 |
| Pore Distribution, % | | | |
| <50 Å | 32 | 42 | 0 |
| 50–100 Å | 16 | 12 | 41 |
| 100–200 Å | 15 | 11 | 32 |
| >200 Å | 37 | 35 | 31 |

[1]Contains 65 wt % MCM-41 and 35 wt % alumina prior to the metal addition.

The MCM-41 materials used in the catalysts containing this crystalline material had a pore opening of 40 Å. All three catalysts have 30% pore volume with pore diameters greater than 200 Å but the MCM-41 catalysts have 30–40% pore volume with pore diameters less than 50 Å.

All catalysts were evaluated in a fixed-bed pilot unit. A poly-alpha olefin (PAO) lube oligomer having the composition shown in Table 6 below was used as the feed.

TABLE 6

Properties of PAO

| | |
|---|---|
| Gravity, °API | 39.2 |
| Hydrogen, wt % | 14.6 |
| Bromine Number | 27.3 |
| KV @ 40° C., cS | 26.22 |
| KV @ 100° C., cS | 5.253 |
| Viscosity Index | 136 |

The PAO was hydrogenated at 2.0 LHSV, 350 psig $H_2$ and 5000 scf/b of once-through hydrogen circulation rate. Reactor temperature was varied to obtain catalyst activity as a function of temperature. Catalyst activity is measured by the reduction of bromine number of the oil.

The Pd MCM-41/$Al_2O_3$ catalyst is the most active catalyst. It achieved the reduction of bromine number to less than 1 at 350° F., the lowest temperature of the experiments. Pt MCM-41/$Al_2O_3$ is also quite active. The Pd/$SiO_2$ catalyst, is the least active catalyst for this reaction.

EXAMPLE 25

This example shows the use of an MCM-41 molecular sieve for selective lube hydrocracking. A NiW/MCM-41 catalyst was prepared in accordance with the method of Example 21 above.

This catalyst was used to hydrocrack a heavy neutral distillate having the properties given in Table 7 below, together with the properties of the oil after solvent dewaxing to 0° F. pour point (ASTM D-97 or equivalent such as Autopour). The feedstock has high nitrogen content of 1500 ppm and that the distillate VI after solvent dewaxing is 53. The objective of lube hydrocracking the distillate is to increase the VI level to the 95–100 VI range after solvent dewaxing while maximizing lube yield.

TABLE 7

Heavy Neutral Distillate Properties

| | |
|---|---|
| Hydrogen, wt % | 12.83 |
| Nitrogen, ppm | 1500 |
| Basic Nitrogen, ppm | 466 |
| Sulfur, wt % | 0.72 |
| API Gravity | 22.0 |
| KV @ 100° C., cS | 18.52 |
| Composition, wt % | |
| Paraffins | 18.3 |
| Naphthenes | 32.2 |
| Aromatics | 49.5 |
| Sim Dist, wt % | |
| IBP | 765 |
| 5 | 846 |
| 10 | 880 |
| 95 | 1086 |
| Solvent Dewaxed Oil Properties | |
| KV @ 100° C., cS | 20.1 |
| VI | 53 |
| Pour Point, °F. | 0 |
| Lube Yield, wt % | 87 |

The distillate was processed at temperatures from 725 to 754° F., 2000 psig hydrogen pressure, 7500 SCFB hydrogen circulation and 0.55 to 0.61 LHSV. The data from these experimental runs are summarized in Table 8 below:

TABLE 8

(LHDC with NiW/MCM-41)

| | | | |
|---|---|---|---|
| Temp., °F. | 125 | 739 | 754 |
| Pressure, psig | 2000 | 2000 | 2000 |
| LHSV | 0.61 | 0.54 | 0.55 |
| 650° F.+ conv., wt % | 9.3 | 20.8 | 36.0 |
| Lube Properties | | | |
| KV @ 100° C., cS | 13.08 | 10.46 | 7.59 |
| SUS @ 100° F. | 772 | 468 | 261 |
| VI | 79 | 98.1 | 113.3 |
| Pour Point, °F. | 15 | 30 | 30 |
| Lube Yield, wt % | 80.5 | 66.6 | 54.3 |

The NiW/MCM-41 catalyst was selective for upgrading the heavy neutral distillate from a raw distillate VI of 53 to a 98 VI product at a conversion level of 20.8 wt %.

EXAMPLE 26

48 parts by weight of cetyltrimethylammonium (CTMA) hydroxide solution, prepared by contacting a 29 wt. % N,N,N-trimethyl-1-hexadecylammonium chloride solution with a hydroxide-for-halide exchange resin, was combined with 1 part by weight of sodium aluminate and 24 parts by weight of an aqueous solution of tetramethylammonium (TMA) silicate (10% silica) with stirring. 6 parts by weight of HiSil™, a precipitated hydrated silica containing about 6 wt. % free water and about 4.5 wt. % bound water of hydration and having an ultimate particle size of about 0.02 micron, was added. The resulting mixture was crystallized at 100° C. for 20 hours. The mixture had a composition in terms of moles per mole $Al_2O_3$:

1.46 moles $Na_2O$ 27.8 moles $SiO_2$ 5.6 moles $(CTMA)_2O$ 3.11 moles $(TMA)_2O$ 723.7 moles $H_2O$ The resulting solid product was recovered by filtration and dried in air at ambient temperature. The product was then calcined at 540° C. for 1 hour in nitrogen, followed by 6 hours in air.

The calcined product proved to have a surface area of 1200 m²/g and the following equilibrium adsorption capacities in grams/100 grams:

| | |
|---|---|
| $H_2O$ | 13.5 |
| Cyclohexane | >50 |
| n-Hexane | 43.6 |
| Benzene | 71 |

The product of this Example has an X-ray diffraction pattern including a very strong relative intensity line at 38.4±2.0 Angstroms d-spacing, and weak lines at 22.6±1.0, 20.0±1.0 and 15.2±1.0 Angstroms.

The product (35 parts by weight) was bound with 65 parts by weight of an alumina binder by a mulling and pelletizing procedure. The pelletized mixture was then calcined, first in nitrogen and then in air, at temperatures up to 1000° F. (538° C.) to remove organic material included in the as-synthesized material.

Cations in the calcined pellets were then exchanged with ammonium cations by contacting the pellets with solutions of 1N $NH_4NO_3$ maintained at a pH of 8. The twice-exchanged pellets were then dried in air at 250° C. (121° C.) followed by calcination at 1000° F. (538° C.) under conditions sufficient to decompose ammonium ions and evolve ammonia, thereby converting the bound material to the hydrogen form.

The hydrogen form of the bound material was then impregnated with an ammonium heptamolybdate solution. More particularly, 45.12 ml of an aqueous solution containing 5.08 grams of ammonium heptamolybdate (81.5 wt. % $MoO_3$) was added to 40 grams of the hydrogen form of the bound material. The resulting wet material was dried at 250° F. (121° C.) and then calcined in air at 1000° F. (538° C.) under conditions sufficient to decompose ammonium heptamolybdate and generate $MoO_3$, thereby producing a molybdenum impregnated material.

The molybdenum impregnated bound material was then impregnated with a nickel nitrate solution. More particularly, 48.14 ml of an aqueous solution containing 9.12 grams of $Ni(NO_3)_2 \cdot 6H_2O$ (21.2 wt. % Ni) was added to the molybdenum impregnated material. The resulting wet material was dried at 250° F.(121° C.) and then calcined in air at 1000° F. (538° C.) to decompose nickel nitrate and generate NiO, thereby producing a nickel and molybdenum impregnated material.

The resulting catalyst had the properties shown in Table 9.

TABLE 9

| NiMo/MCM-41 Catalyst Properties | |
|---|---|
| Nickel | 4.9 |
| Molybdenum | 8.0 |
| Real Density, g/cc | 2.784 |
| Surface Area, m²/g | 306 |

(1) 65 wt % MCM-41 and 35 wt % alumina prior to the metals addition.

EXAMPLE 27

The catalyst of Example 26 was tested for upgrading an Arabian Light Atmospheric Resid having the properties set out in Table 10 below.

TABLE 10

| Arabian Light Atmospheric Resid | |
|---|---|
| General Properties | |
| Gravity, API° | 18.2 |
| Hydrogen, wt % | 11.71 |
| Sulfur, wt % | 3.0 |
| Nitrogen, ppmw | 0.15 |
| CCR, wt % | 7.7 |
| Asphaltenes, wt % | 5.7 |
| Trace Metals, ppmw | |
| Nickel | 8.9 |
| Vanadium | 34.0 |
| Iron | 2.7 |
| Distillation, °F. | |
| IBP | 447 |
| 10% | 651 |
| 30% | 814 |
| 50% | 965 |
| 60% | 1056 |

The oil was processed at 1000 psig and a weight hourly space velocity (WHSV) of 0.66. Reactor temperature was varied from 600° F. (315° C.) to 750° F. (399° C.) to cover a wide range of conversion. The results of this test are given in Table 11. These results indicate that the catalyst is active for demetallation and asphaltene removal while requiring low hydrogen consumption (as determined by the low hydrogen content of the products).

TABLE 11

| Product Properties (ATM Resid. 1900 psig, 0.66 WHSV) | | | |
|---|---|---|---|
| Temperature °F. | Metals Ni + V, ppmw | Asphaltenes Wt % | Hydropen Wt % |
| 600 | 21.8 | 2.61 | 12.04 |
| 650 | 13.2 | 0.9 | 12.43 |
| 700 | 3.8 | 0.29 | 12.54 |
| 725 | 1.2 | — | 12.66 |
| 750 | 0.2 | — | 12.77 |

EXAMPLE 28

Cations in the as-synthesized material of Example 27 were exchanged with ammonium cations by contacting the material with a solution of 1M NH$_4$NO$_3$ at room temperature for one hour. The exchanged material was filtered and rinsed with water. This exchange/filter/rinse procedure was repeated and the material was then dried at 250° F. (121° C.) overnight to form an ammonium exchanged material.

35 parts by weight of this ammonium exchanged material was bound with 65 parts by weight of an alumina binder by an extrusion procedure, producing extrudate in the form of $\frac{1}{16}$-inch cylinders. The extruded, bound material was dried overnight at 250° F. (121° C.). The dried material was then calcined, first in nitrogen and then in air, at temperatures up to 1000° F. (538° C.) under conditions sufficient to decompose ammonium ions and to substantially remove organic material, thereby converting the material to the hydrogen form.

The hydrogen form of the bound material was humidified with moist air by placing the material in the path of a stream of air which had been passed through a bubbler at room temperature. The moisture saturated material was then impregnated with a solution containing ammonium heptamolybdate and nickel nitrate: 214.8 ml of an aqueous solution containing 25.8 grams of ammonium heptamolybdate (54.3 wt. % Mo, 81.5 wt. % MoO$_3$) and 27.7 grams of Ni(NO$_3$)$_2$®6H$_2$O (20.2 wt. % Ni) was added to 182 grams of the moisture saturated bound material. The resulting wet material was dried at 250° F. (121° C.) and then calcined in air at 1000° F. (538° C.) under conditions sufficient to decompose ammonium heptamolybdate and nickel nitrate, generating MoO$_3$ and NiO, to produce a molybdenum/nickel impregnated catalyst.

The resulting catalyst had the properties shown in Table 12.

TABLE 12

| Catalyst Properties | |
|---|---|
| Chemical Composition | |
| NiO, wt % | 3.3 |
| MoO$_3$, wt % | 7.6 |
| Physical Properties | |
| Surface Area (BET), m$^2$/g | 645 |
| Pore Volume, cc/g | 0.88 |
| Avg Pore Dia., Angstroms | 55 |
| PSD (Hg Porosimetry), cc/g | |
| <30 Å | 0.26 |
| 30–100 Å | 0.19 |
| 100–200 Å | 0.14 |
| >200 Å | 0.29 |

This catalyst was evaluated for upgrading Paraho shale oil at relatively mild conditions (2.0 LHSV and 1000 psig H$_2$). Analyses of the retorted Paraho shale oil are given in Table 13. Experimental data are summarized in Table 14.

TABLE 13

| Retorted Paraho Shale Oil | |
|---|---|
| Gravity, °API | 21.7 |
| Hydrogen, wt % | 11.49 |
| Nitrogen, wt % | 2.20 |
| Sulfur, wt % | 0.69 |
| Arsenic, ppmw | 37 |
| Iron, ppmw | 27 |
| Nickel, ppmw | 2.4 |
| Bromine Number | 45 |

TABLE 13-continued

| Retorted Paraho Shale Oil | |
|---|---|
| Molecular Weight | 307 |
| C=C bonds per molecule | 0.85 |
| Distillation | D 2887 |
| 5% | 463 |
| 30% | 703 |
| 50% | 809 |
| 70% | 915 |
| 95% | — |

The results of this evaluation showed that the catalyst was active for olefin saturation, removal of iron and nickel, and denitrogenation. The catalyst is also active for arsenic removal and desulfurization. The catalyst can dearsenate the shale oil to less than 1.0 ppmw at 700° F. (371° C.).

TABLE 14

| Hydroprocessing Of Shale Oil (2.0 LHSV/1000 psig H$_2$) | | | | | | |
|---|---|---|---|---|---|---|
| Temp., °F. | Bromine No | Iron (ppmw) | Nickel (ppmw) | Arsenic (ppmw) | Sulfur (wt %) | Nitrogen (ppmw) |
| 500 | 0.9 | 4.3 | 2.4 | 7.5 | 0.66 | 2.18 |
| 550 | <0.1 | 3.1 | 1.9 | 5.0 | 0.60 | 1.98 |
| 600 | <0.1 | 2.2 | 1.8 | 2.5 | 0.54 | 1.94 |
| 700 | <0.1 | 0.3 | 1.6 | <1.0 | 0.32 | 1.59 |
| 717 | nm | nm | nm | nm | nm | nm |
| 750 | <0.1 | 0.1 | 0.2 | <1.0 | 0.15 | 1.41 | nm = not measured

We claim:

1. A catalytic composition comprising a metal having hydrogenation-dehydrogenation functionality supported on a support material comprising a non-layered, inorganic, porous crystalline phase material exhibiting, after calcination, an X-ray diffraction pattern with at least one peak having a relative intensity of 100 at a d-spacing greater than about 18 Å and having a benzene sorption capacity greater than about 15 grams benzene per 100 grams of the material at 50 torr and 25° C.

2. A catalytic composition according to claim 1 in which the crystalline material has, after calcination, an arrangement of uniformly-sized pores having diameters of at least about 13 Angstrom Units.

3. A catalytic composition according to claim 1 in which the crystalline material exhibits an electron diffraction pattern that can be indexed with a d$_{100}$ value greater than about 18 Angstrom Units.

4. A catalytic composition according to claim 1 in which the crystalline phase has an X-ray diffraction pattern following calcination with at least one peak whose d-spacing corresponds to the d$_{100}$ value from the electron diffraction pattern.

5. A catalytic composition according to claim 1 in which the crystalline phase has a hexagonal arrangement of uniformly-sized pores of at least 13 Å diameter and which exhibits, after calcination, a hexagonal electron diffraction pattern that can be indexed with a d$_{100}$ value greater than about 18 Å.

6. A catalytic composition according to claim 5 in which the crystalline phase has an X-ray diffraction pattern following calcination with at least one peak whose d-spacing corresponds to the d$_{100}$ value from the electron diffraction pattern.

7. A catalytic composition according to claim 5 in which the crystalline phase has, after calcination, an X-ray diffraction pattern which exhibits at least two peaks at positions greater than about 10 Angstrom Units d-spacing at least one of which is at a position greater than about 18 Angstrom Units d-spacing, and no peaks at positions less than about 10 Angstrom units d-spacing with relative intensity greater than about 20% of the strongest peak.

8. A catalytic composition according to claim 5 in which the crystalline phase has, after calcination, an X-ray diffraction pattern which exhibits no peaks at positions less than about 10 Angstrom units d-spacing with relative intensity greater than about 10% of the strongest peak.

9. A catalytic composition according to claim 1 in which the crystalline material is a metallosilicate.

10. A catalytic composition according to claim 9 in which the crystalline material is an aluminosilicate.

11. A catalytic composition according to claim 1 in which the composition includes at least 0.1 weight percent of the metal hydrogenation-dehydrogenation component.

12. A catalytic composition according to claim 11 in which the composition includes at least 0.1 weight percent of a noble metal from Period 5 or 6 of Group VIII of the Periodic Table.

13. A catalytic composition according to claim 12 in which the noble metal comprises platinum.

14. A catalytic composition according to claim 1 in which the composition includes a base metal hydrogenation- dehydrogenation component comprising at least one metal from Group VIII of the Periodic Table.

15. A catalytic composition according to claim 14 in which the metal hydrogenation- dehydrogenation component comprises at least one metal from Group VIII of the Periodic Table and at least one metal from Group VIB of the Periodic Table.

16. A catalytic composition according to claim 14 in which the metal hydrogenation- dehydrogenation component comprises nickel and tungsten.

17. A catalytic composition according to claim 14 in which the amount of the metal hydrogenation- dehydrogenation component is at least 1 weight percent.

18. A catalytic composition according to claim 14 in which the amount of the metal hydrogenation- dehydrogenation component is at least 5 weight percent.

19. A catalytic composition according to claim 1 which includes a matrix material composited with the crystalline material.

20. A catalytic composition according to claim 19 in which the matrix material comprises alumina.

21. A catalytic composition comprising at least 0.1 weight percent based on the weight of the composition, of a metal having hydrogenation- dehydrogenation functionality supported on a support material comprising a crystalline phase material having a hexagonal arrangement of uniformly-sized pores having diameters of at least about 13 Angstrom Units, and a hexagonal electron diffraction pattern that can be indexed with a $d_{100}$ value greater than about 18 Angstrom Units.

22. A catalytic composition according to claim 21 in which the crystalline support material has a composition, expressed on an anhydrous basis as follows:

$$rRM_{n/q}(W_aX_bY_cZ_dO_h)$$

wherein R is the total organic material not included in M; r is the number of moles or mole fraction of R; M is one or more ions; n is the charge of the composition excluding M expressed as oxides; q is the weighted molar average valence of M; n/q is the number of moles or mole fraction of M; W is one or more divalent elements; X is one or more trivalent elements; Y is one or more tetravalent elements; Z is one or more pentavalent elements; a, b, c, and d are mole fractions of W, X, Y, and Z, respectively; h is a number of from 1 to 2.5; and (a+b+c+d)=1.

23. A catalytic composition according to claim 21 in which the crystalline material is a metallosilicate.

24. A catalytic composition according to claim 23 in which the crystalline material is an aluminosilicate.

25. A catalytic composition according to claim 21 in which the composition includes at least 0.1 weight percent of a noble metal from Period 5 or 6 of Group VIII of the Periodic Table.

26. A catalytic composition according to claim 21 in which the composition includes at least 1 weight percent based on the weight of the composition of a base metal hydrogenation- dehydrogenation component comprising at least one metal from Group VIII of the Periodic Table.

27. A catalytic composition according to claim 26 in which the metal hydrogenation- dehydrogenation component comprises at least one metal from Group VIII of the Periodic Table and at least one metal from Group VIB of the Periodic Table.

28. A catalytic composition according to claim 21 in which the amount of the metal hydrogenation- dehydrogenation component is at least 5 weight percent.

29. A catalytic composition according to claim 21 which includes a matrix material composited with the crystalline material.

30. A catalytic composition according to claim 19 in which the matrix material comprises alumina.

31. A method of making a catalytic composition comprising a metal having hydrogenation- dehydrogenation functionality supported on a support material, the method comprising incorporating a metal having hydrogenation-dehydrogenation functionality with a support material comprising a non-layered, inorganic, porous crystalline phase material exhibiting, after calcination, an X-ray diffraction pattern with at least one peak having a relative intensity of 100 at a d-spacing greater than about 18 Å and having a benzene sorption capacity greater than about 15 grams benzene per 100 grams of the material at 50 torr and 25° C.

32. A method according to claim 31 in which the metal is incorporated into the support material by cation-exchange with the support material.

33. A method according to claim 32 in which the metal is incorporated into the support material by cation-exchange with the crystalline material in the as-synthesized condition.

34. A method according to claim 31 in which the metal is incorporated into a support material comprising the crystalline phase material and a binder.

35. A method according to claim 34 in which the metal is incorporated into the support material by impregnation.

* * * * *